(12) United States Patent  
Kanai et al.

(10) Patent No.: US 7,830,615 B2  
(45) Date of Patent: Nov. 9, 2010

(54) ZOOM LENS AND IMAGE PICKUP APPARATUS

(75) Inventors: Makoto Kanai, Tokyo (JP); Masaharu Hosoi, Tokyo (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 12/453,097

(22) Filed: Apr. 29, 2009

(65) Prior Publication Data

US 2009/0290231 A1 Nov. 26, 2009

(30) Foreign Application Priority Data

May 26, 2008 (JP) ............................. 2008-137106

(51) Int. Cl.
*G02B 15/14* (2006.01)
*G02B 15/177* (2006.01)
(52) U.S. Cl. ...................................... 359/689; 359/683
(58) Field of Classification Search ................ 359/676, 359/682, 683, 686, 689; 396/78–88; 348/240.99–240.3; G02B 15/177, 15/14

See application file for complete search history.

(56) References Cited

U.S. PATENT DOCUMENTS 6,671,103 B2 * 12/2003 Itoh ............................ 359/689

7,227,696 B1 * 6/2007 Nanba ......................... 359/689

FOREIGN PATENT DOCUMENTS

| JP | 2002-244043 | 8/2002 |
| JP | 2004-191599 | 7/2004 |
| JP | 2007-212777 | 8/2007 |

* cited by examiner

*Primary Examiner*—Scott J Sugarman  
*Assistant Examiner*—Zachary Wilkes  
(74) *Attorney, Agent, or Firm*—Rader, Fishman & Grauer PLLC

(57) ABSTRACT

A zoom lens includes first to third negative, positive, positive lens groups. The second lens group includes first to fourth positive, negative, negative, positive lenses. The third and fourth lenses of the second lens group are bonded to each other to serve as a cemented lens. The zoom lens is configured to satisfy Conditional Expressions (1) and (2) as follows:

$$-0.5 < f2/f2R < 0, \text{ and} \quad (1)$$

$$0.09 < L2/LT < 0.19, \quad (2)$$

where f2 is a focal length of the second lens group, f2R is a combined focal length of the cemented lens including the third and fourth lenses of the second lens group, L2 is an overall length on an optical axis of the second lens group, and LT is an optical overall length at the telephoto end.

4 Claims, 17 Drawing Sheets

ZOOM LENS AND IMAGE PICKUP APPARATUS

BACKGROUND OF THE INVENTION

1. Field of the Invention

The present invention relates to a zoom lens and an image pickup apparatus. In particular, the present invention relates to a technical field of a zoom lens suitable for an imaging optical system in a digital input/output apparatus and of an image pickup apparatus including the zoom lens.

2. Description of the Related Art

In recent years, a compact image pickup apparatus, such as a digital video camera or a digital still camera, has become popular. In such an image pickup apparatus, it is demanded to increase a lens performance of a zoom lens to meet increase in the number of pixels of an image pickup device. Also, the image pickup apparatus is desired to be reduced in size. Owing to this, it is demanded to reduce an overall length of the zoom lens. Further, manufacturing of the image pickup apparatus is desired to be facilitated to increase productivity by decreasing a sensitivity of decentration.

Zoom lenses mounted on image pickup apparatuses, for example, digital still cameras, involve various types of zoom lenses. One of such zoom lenses mounted on the image pickup apparatuses and reduced in size is a zoom lens including three lens groups including a first lens group having a negative refractive power, a second lens group having a positive refractive power, and a third lens group having a positive refractive power arranged in that order from an object side to an image side (for example, see Japanese Unexamined Patent Application Publication Nos. 2002-244043, 2004-191599, and 2007-212777).

A zoom lens disclosed in Japanese Unexamined Patent Application Publication No. 2002-244043 includes a second lens group including two cemented lenses having positive refractive powers.

A zoom lens disclosed in Japanese Unexamined Patent Application Publication No. 2004-191599 includes a second lens group including two cemented lenses. The second lens group includes five lenses in total, i.e., three positive lenses and two negative lenses.

A zoom lens disclosed in Japanese Unexamined Patent Application Publication No. 2007-212777 includes a second lens group including a single lens having a positive refractive power and a cemented lens having a negative refractive power and including two lenses.

SUMMARY OF THE INVENTION

In the zoom lens disclosed in Japanese Unexamined Patent Application Publication No. 2002-244043, a distance between the two cemented lenses of the second lens group is large. When the zoom lens is applied to a collapsible image pickup apparatus including an expandable/contractible lens barrel, in particular, an optical overall length may become large when the lens barrel is contracted. This may be a bottleneck to reduction in size.

Also, the zoom lenses disclosed in Japanese Unexamined Patent Application Publication Nos. 2002-244043 and 2004-191599 each include the second lens group including the cemented lens at the image side having the positive refractive power. The principal point of the second lens group may be located at a position close to the image side. The optical overall length may become large. This may be a bottleneck to reduction in size.

The zoom lens disclosed in Japanese Unexamined Patent Application Publication No. 2004-191599 includes the second lens group including the five lenses. The number of lenses is large, and hence, the optical overall length may become large. This does not satisfy the demand of reduction in size. In particular, in the case where the zoom lens is applied to the collapsible image pickup apparatus, the optical overall length may become large when the lens barrel is contracted. This may be a bottleneck to reduction in size.

The zoom lens disclosed in Japanese Unexamined Patent Application Publication No. 2007-212777 promotes reduction in size such that the second lens group includes the three lenses. However, aberration correction amounts assigned to the lenses of the second lens group may be increased. The sensitivity of decentration of the second lens group may be increased, and hence, the manufacturing may become difficult.

Accordingly, it is desirable to provide a zoom lens and an image pickup apparatus that address the above-mentioned bottlenecks, promote reduction in size by decreasing an optical overall length, and promote increase in productivity by decreasing a sensitivity of decentration while a high optical performance is provided.

A zoom lens according to an embodiment of the present invention includes a first lens group having a negative refractive power, a second lens group having a positive refractive power, and a third lens group having a positive refractive power, in that order from an object side to an image side. During zooming from a wide-angle end to a telephoto end, the first lens group is moved, and the second lens group is moved to the object side, in an optical-axis direction such that an air distance between the first and second lens groups is decreased and an air distance between the second and third lens groups is increased. The second lens group includes a first lens having a positive refractive power, a second lens having a negative refractive power, a third lens having a negative refractive power, and a fourth lens having a positive refractive power, in that order from the object side to the image side. The third and fourth lenses of the second lens group are bonded to each other to serve as a cemented lens. The zoom lens is configured to satisfy Conditional Expressions (1) and (2) as follows:

$$-0.5 < f2/f2R < 0, \text{ and} \tag{1}$$

$$0.09 < L2/LT < 0.19, \tag{2}$$

where f2 is a focal length of the second lens group, f2R is a combined focal length of the cemented lens including the third and fourth lenses of the second lens group, L2 is an overall length on an optical axis of the second lens group, and LT is an optical overall length at the telephoto end.

In the zoom lens of the embodiment, the second lens group includes the four lenses containing the cemented lens. Also, the focal length of the cemented lens including the third and fourth lenses of the second lens group, and the optical overall length of the second lens group are determined within the predetermined ranges.

Accordingly, with the zoom lens of the embodiment, the optical overall length can be decreased, and hence reduction in size can be promoted. Also, productivity can be increased by decreasing the sensitivity of decentration while a high optical performance is provided.

Preferably, the zoom lens is configured to satisfy Conditional Expressions (3) as follows:

$$v24 - v23 > 20, \tag{3}$$

where ν24 is an Abbe number of the fourth lens of the second lens group, ν23 is an Abbe number of the third lens of the second lens group.

Since Conditional Expression (3) is satisfied, occurrence of chromatic aberration can be reduced.

In addition, in the zoom lens according to the embodiment, an image-side surface of the fourth lens of the second lens group is preferably aspherical.

Since the image-side surface of the fourth lens of the second lens group is aspherical, occurrence of coma and astigmatism can be reduced.

An image pickup apparatus according to another embodiment of the present invention includes a zoom lens; and an image pickup device that converts an optical image formed by the zoom lens into an electric signal. The zoom lens includes a first lens group having a negative refractive power, a second lens group having a positive refractive power, and a third lens group having a positive refractive power, in that order from an object side to an image side. During zooming from a wide-angle end to a telephoto end, the first lens group is moved, and the second lens group is moved to the object side, in an optical-axis direction such that an air distance between the first and second lens groups is decreased and an air distance between the second and third lens groups is increased. The second lens group includes a first lens having a positive refractive power, a second lens having a negative refractive power, a third lens having a negative refractive power, and a fourth lens having a positive refractive power, in that order from the object side to the image side. The third and fourth lenses of the second lens group are bonded to each other to serve as a cemented lens. The zoom lens is configured to satisfy Conditional Expressions (1) and (2) as follows:

$$-0.5 < f2/f2R < 0, \text{ and} \quad (1)$$

$$0.09 < L2/LT < 0.19, \quad (2)$$

where f2 is a focal length of the second lens group, f2R is a combined focal length of the cemented lens including the third and fourth lenses of the second lens group, L2 is an overall length on an optical axis of the second lens group, and LT is an optical overall length at the telephoto end.

In the image pickup apparatus of the embodiment, the second lens group of the zoom lens includes the four lenses containing the cemented lens. Also, the focal length of the cemented lens including the third and fourth lenses of the second lens group of the zoom lens, and the optical overall length of the second lens group of the zoom lens are determined within the predetermined ranges.

Accordingly, with the zoom lens provided in the image pickup apparatus of the embodiment, the optical overall length can be decreased, and hence reduction in size can be promoted. Also, productivity can be increased by decreasing the sensitivity of decentration while a high optical performance is provided.

DESCRIPTION OF THE PREFERRED EMBODIMENTS

Figure 1:
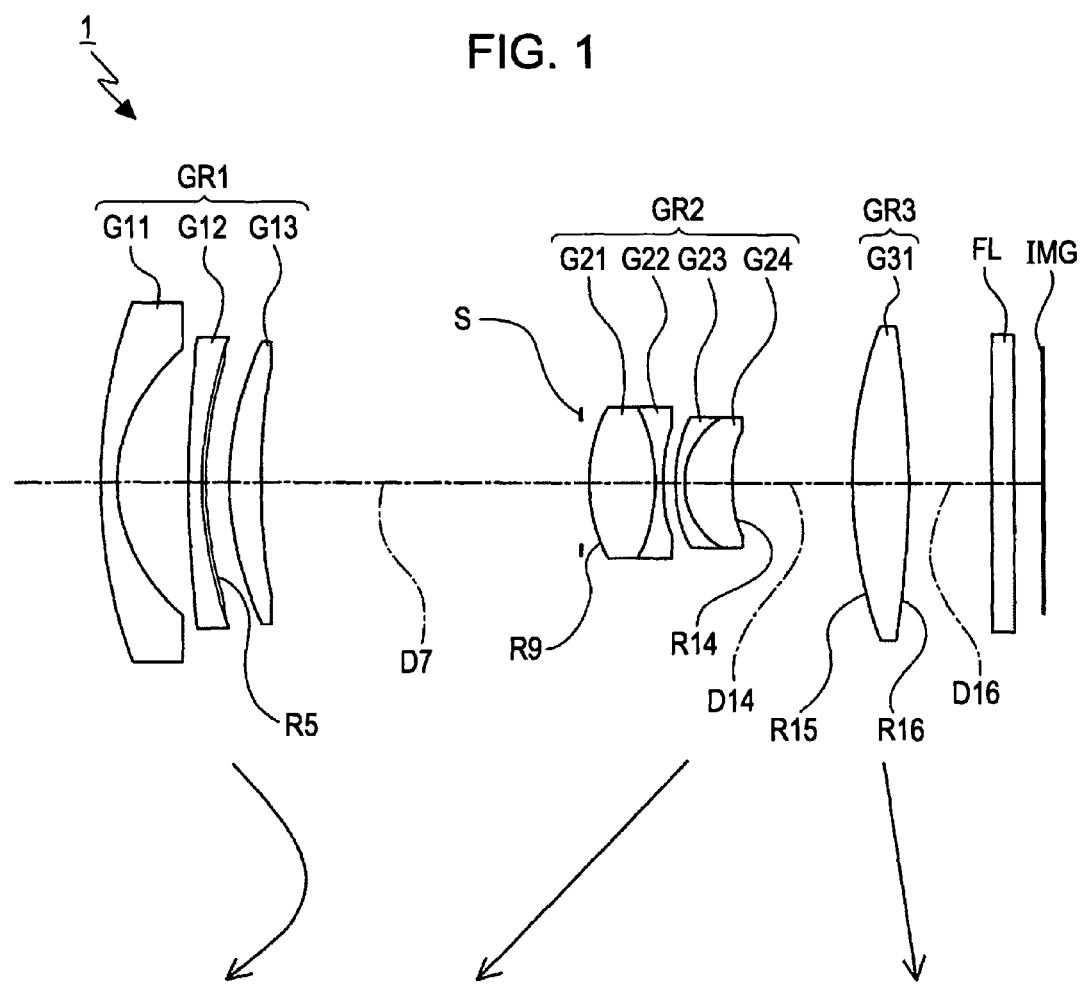
FIG. 1 illustrates a lens configuration of a zoom lens according to a first embodiment, which is a preferred embodiment to implement an image pickup apparatus and a zoom lens, together with FIGS. 2 to 17.

Preferred embodiments for implementing a zoom lens and an image pickup apparatus are described below.

First, a zoom lens according to an embodiment of the present invention is described.

The zoom lens according to the embodiment of the present invention includes a first lens group having a negative refractive power, a second lens group having a positive refractive power, and a third lens group having a positive refractive power, in that order from an object side to an image side. The first, second, and third lens groups are moved in an optical-axis direction during zooming between a wide-angle end and a telephoto end.

For example, during zooming from the wide-angle end to the telephoto end, the first lens group is moved, the second lens group is moved to the object side, and the third lens group is moved to the image side, in an optical-axis direction such that an air distance between the first and second lens groups is decreased and an air distance between the second and third lens groups is increased.

In the zoom lens of the embodiment, the second lens group includes a first lens having a positive refractive power, a second lens having a negative refractive power, a third lens having a negative refractive power, and a fourth lens having a positive refractive power, in that order from the object side to the image side. The third and fourth lenses are bonded, thereby serving as a cemented lens.

In the zoom lens of the embodiment, the second lens group includes the four lenses, and the cemented lens is provided by the third and fourth lenses. That is, the number of lenses is small, and the two lenses serve as the cemented lens. Thus, an optical overall length can be decreased.

The zoom lens is configured to satisfy Conditional Expressions (1) and (2) as follows:

$$-0.5 < f2/f2R < 0, \text{ and} \quad (1)$$

$$0.09 < L2/LT < 0.19, \quad (2)$$

where f2 is a focal length of the second lens group, f2R is a combined focal length of the cemented lens including the third and fourth lenses of the second lens group, L2 is an overall length on an optical axis of the second lens group, and LT is an optical overall length at the telephoto end.

Conditional Expression (1) determines a ratio of the focal length of the second lens group to the focal length of the cemented lens including the third lens having the negative refractive power and the fourth lens having the positive refractive power of the second lens group.

If the value of Conditional Expression (1) is above the upper limit, the position of the principal point of the second lens becomes too close to the image side. The optical overall length may become large. This may be a bottleneck to reduction in size.

In contrast, if the value of Conditional Expression (1) is below the lower limit, the refractive power of the cemented lens including the third lens and the fourth lens of the second lens group becomes excessively large. Hence, a combined refractive power of the first and second lenses of the second lens also becomes large. Accordingly, sensitivities of decentration of the cemented lens, and the first and second lenses of the second lens group become excessively large. Manufacturing may become difficult.

If the value of Conditional Expression (1) is below the lower limit, in particular, a distance between an exit pupil position and an image plane becomes small at the wide-angle end, and an incident angle of an off-axis light beam with respect to the image plane becomes large. Hence, shading is increased.

Conditional Expression (2) determines an overall length of the second lens group.

To decrease the optical overall length of the entire zoom lens system when being collapsed (contracted), it is desirable to decrease the overall length of the second lens group. If the value of Conditional Expression (2) is below the lower limit, however, the overall length of the second lens group becomes excessively small, a sensitivity to a decentration error of the second lens group becomes high. Hence, assembly has to be performed with extremely high accuracy.

In contrast, if the value of Conditional Expression (2) is above the upper limit, the overall length of the second lens group becomes excessively large, and it is difficult to promote reduction in the optical overall length in the collapsed state.

Thus, when the zoom lens satisfies Conditional Expressions (1) and (2), the optical overall length can be decreased, and hence reduction in size can be promoted. Also, productivity can be increased by decreasing the sensitivity of decentration while a high optical performance is provided.

In the zoom lens according to the embodiment of the present invention, Conditional Expression (3) is preferably satisfied as follows:

$$v24 - v23 > 20, \quad (3)$$

where v24 is an Abbe number of the fourth lens of the second lens group, v23 is an Abbe number of the third lens of the second lens group.

Conditional Expression (3) determines a relationship between the Abbe number of the third lens (negative lens) and the Abbe number of the fourth lens (positive lens) of the cemented lens of the second lens group.

If the value is outside the range defined by Conditional Expression (3), the difference of Abbe numbers becomes excessively small. Chromatic aberration is not sufficiently corrected, and the optical performance is decreased.

When the zoom lens satisfies Conditional Expression (3), the chromatic aberration can be properly corrected, and the optical performance can be increased.

In the embodiment, the numerical range of Conditional Expression (3) is preferably set to a range of Conditional Expression (3)' as follows:

$$v24 - v23 > 25. \quad (3)'$$

The Abbe numbers of the third and fourth lenses of the second lens group may be set to desired values within the range defined by Conditional Expression (3) or (3)' depending on selected materials.

In addition, with the zoom lens according to the embodiment of the present invention, an image-side surface of the fourth lens of the second lens group is preferably aspherical.

When the image-side surface of the fourth lens of the second lens group is aspherical, coma and astigmatism can be properly corrected.

In the zoom lens, when one of the first to third lens groups or a part of a lens group is moved (shifted) in a direction substantially perpendicular to the optical axis, an image can be shifted. The zoom lens may also function as an image stabilization optical system by moving the lens group or a part of the lens group in the direction substantially perpendicular to the optical axis, and by providing a combination of a detection system that detects image blur, a driving system that shifts lens groups, and a control system that applies a shift amount based on the output of the detection system to the driving system. In particular, in the zoom lens according to the embodiment of the present invention, the entire second lens group is shifted in the direction substantially perpendicular to the optical axis. Accordingly, an image can be shifted with a small aberration variation.

In the zoom lens according to the embodiment of the present invention, it is desirable to perform focusing by moving the first or third lens group in the optical-axis direction. In particular, when the third lens group serves as a lens group for focusing, the third lens group is easily prevented from interfering with a driving system that performs driving control of a shutter unit or an iris unit, or an image stabilization driving system that shifts a lens group. Thus, reduction in size can be promoted.

Next, specific embodiments of the zoom lens, and numerical examples to which specific numerical values are applied to the embodiments are described with reference to drawings and tables.

Meaning of reference characters used in tables and description is described below.

"Si" represents a surface number of an i-th surface counted from the object side to the image side, "Ri" represents a curvature radius of the i-th surface, "Di" represents an axial surface distance between the i-th surface and an (i+1)-th surface, "Ni" represents a refractive index at the d-line (wavelength: 587.6 nm) of a material of an i-th lens, and "vi" is an Abbe number at the d-line of the material of the i-th lens.

Regarding the curvature of radius, "ASP" represents an aspherical surface, and "INF" represents a flat surface.

Some lenses used in the respective numerical examples have aspherical lens surfaces. The aspherical surface shape is defined by Equation 1 as follows:

$$x = \frac{cy^2}{1+\sqrt{[1-(1+K)c^2y^2]}} + \Sigma A_i \cdot y^i \qquad \text{Equation 1}$$

where "x" is a distance from a vertex of a lens surface in the optical-axis direction, "y" is a height in a direction perpendicular to the optical axis, "c" is a paraxial curvature (reciprocal of curvature radius) at the lens vertex, "K" is a conic constant, and "Ai" is an i-th order aspherical coefficient.

FIG. 1 illustrates a lens configuration of a zoom lens 1 according to a first embodiment of the present invention.

The zoom lens 1 of the first embodiment includes eight lenses as shown in FIG. 1.

The zoom lens 1 includes a first lens group GR1 having a negative refractive power, a second lens group GR2 having a positive refractive power, and a third lens group GR3 having a positive refractive power, in that order from an object side to an image side.

In the zoom lens 1, the first lens group GR1, the second lens group GR2, and the third lens group GR3 are moved in an optical-axis direction during zooming between a wide-angle end and a telephoto end. For example, during zooming from the wide-angle end to the telephoto end, the first lens group GR1, the second lens group GR2, and the third lens group GR3 are moved in the optical-axis direction such that an air distance between the first lens group GR1 and the second lens group GR2 is decreased and an air distance between the second lens group GR2 and the third lens group GR3 is increased. In contrast, during zooming from the telephoto end to the wide-angle end, the first lens group GR1, the second lens group GR2, and the third lens group GR3 are moved in the optical-axis direction such that the air distance between the first lens group GR1 and the second lens group GR2 is increased and the air distance between the second lens group GR2 and the third lens group GR3 is decreased.

The first lens group GR1 includes a meniscus first lens G11 having a negative refractive power with its convex surface facing the object side, a meniscus compound aspherical second lens G12 having a negative refractive power with its convex surface facing the object side, and a meniscus third lens G13 having a positive refractive power with its convex surface facing the object side, in that order from the object side to the image side. An image-side surface of the second lens G12 is aspherical.

The second lens group GR2 includes a biconvex first lens G21 having a positive refractive power, a biconcave second lens G22 having a negative refractive power, a meniscus third lens G23 having a negative refractive power with its convex surface facing the object side, and a meniscus fourth lens G24 having a positive refractive power with its convex surface facing the object side, in that order from the object side to the image side. An object-side surface of the first lens G21 and an image-side surface of the fourth lens G24 are aspherical.

The first lens G21 and the second lens G22 form a cemented lens having a bonding surface R10, at which an image-side convex surface of the first lens G21 is bonded to an object-side concave surface of the second lens G22. The convex and concave surfaces have the same curvature radius.

The third lens G23 and the fourth lens G24 form a cemented lens having a bonding surface R13, at which an image-side concave surface of the third lens G23 is bonded to an object-side convex surface of the fourth lens G24. The concave and convex surfaces have the same curvature radius.

The third lens group GR3 includes a biconvex lens G31 having a positive refractive power. Both surfaces of the lens G31 are aspherical.

An aperture stop S (aperture stop surface R8) is arranged between the first lens group GR1 and the second lens group GR2.

A filter FL is arranged between the third lens group GR3 and an image plane IMG.

Table 1 shows lens data of Numerical Example 1 to which specific numerical values are applied to the zoom lens 1 according to the first embodiment.

TABLE 1

| Si | Ri | Di | Ni | vi |
|---|---|---|---|---|
| 1 | 33.205 | 1.000 | 1.88300 | 40.8 |
| 2 | 10.500 | 4.241 | | |
| 3 | 72.761 | 0.900 | 1.61800 | 63.4 |
| 4 | 26.760 | 0.100 | 1.53420 | 41.7 |
| 5 | 21.482 (ASP) | 1.533 | | |
| 6 | 20.743 | 1.927 | 1.84666 | 23.8 |
| 7 | 60.486 | D7 | | |
| 8 | Aperture stop | 0.500 | | |
| 9 | 9.668 (ASP) | 3.900 | 1.85135 | 40.1 |
| 10 | −12.769 | 0.600 | 1.64769 | 33.8 |
| 11 | 12.583 | 0.672 | | |
| 12 | 9.731 | 0.590 | 2.00069 | 25.5 |
| 13 | 4.830 | 2.738 | 1.69350 | 53.2 |
| 14 | 9.520 (ASP) | D14 | | |
| 15 | 35.506 (ASP) | 3.400 | 1.61881 | 63.9 |
| 16 | −32.138 (ASP) | D16 | | |
| 17 | INF | 1.800 | 1.51872 | 64.2 |
| 18 | INF | | | |

In the zoom lens 1, an image-side surface (R5) of the second lens G12 of the first lens group GR1, an object-side surface (R9) of the first lens G21 of the second lens group GR2, an image-side surface (R14) of the fourth lens G24 of the second lens group GR2, an object-side surface (R15) of the lens G31 of the third lens group GR3, and an image-side surface (R16) of the lens G31 of the third lens group GR3 are aspherical. Table 2 shows aspherical coefficients A4, A6, A8, and A10 of 4th, 6th, 8th, and 10th orders of the aspherical surfaces of Numerical Example 1, together with conic constants K.

In Table 2 and below-described tables showing aspherical coefficients, "E−i" represents an exponent based on 10, i.e., "$10^{-i}$". For example, "0.12345E−05" represents "$0.12345 \times 10^{-5}$".

TABLE 2

| Si | K | A4 | A6 | A8 | A10 |
|---|---|---|---|---|---|
| 5 | 0.00000E+00 | −7.04741E−05 | −4.13183E−08 | −3.66756E−09 | −1.02671E−11 |
| 9 | 0.00000E+00 | −9.48320E−05 | −7.72767E−07 | −4.82074E−08 | 8.12567E−10 |
| 14 | 0.00000E+00 | 2.40216E−04 | 8.28194E−06 | −7.48375E−07 | 1.44741E−08 |

TABLE 2-continued

| Si | K | A4 | A6 | A8 | A10 |
|---|---|---|---|---|---|
| 15 | 0.00000E+00 | 7.63309E−05 | −1.02535E−06 | 1.13956E−08 | −4.62808E−11 |
| 16 | 0.00000E+00 | 2.10714E−04 | −2.70474E−06 | 2.87685E−08 | −9.99317E−11 |

In the zoom lens 1, during zooming between the wide-angle end and the telephoto end, a surface distance D7 between the first lens group GR1 and the second lens group GR2, a surface distance D14 between the second lens group GR2 and the third lens group GR3, and a surface distance D16 between the third lens group GR3 and the filter FL are variable. Table 3 shows variable distances of surface distances at the wide-angle end (focal length f=9.90), the intermediate focal length (focal length f=16.3), and the telephoto end (focal length f=28.5) in Numerical Example 1, together with F-numbers Fno and half view angles ω.

TABLE 3

| Fno | 2.90 | 3.83 | 5.58 |
|---|---|---|---|
| f | 9.90 | 16.3 | 28.5 |
| ω | 40.3 | 26.1 | 15.4 |
| D7 | 19.058 | 8.932 | 2.000 |
| D14 | 7.154 | 15.277 | 28.894 |
| D16 | 5.000 | 4.212 | 3.041 |

Figure 2:
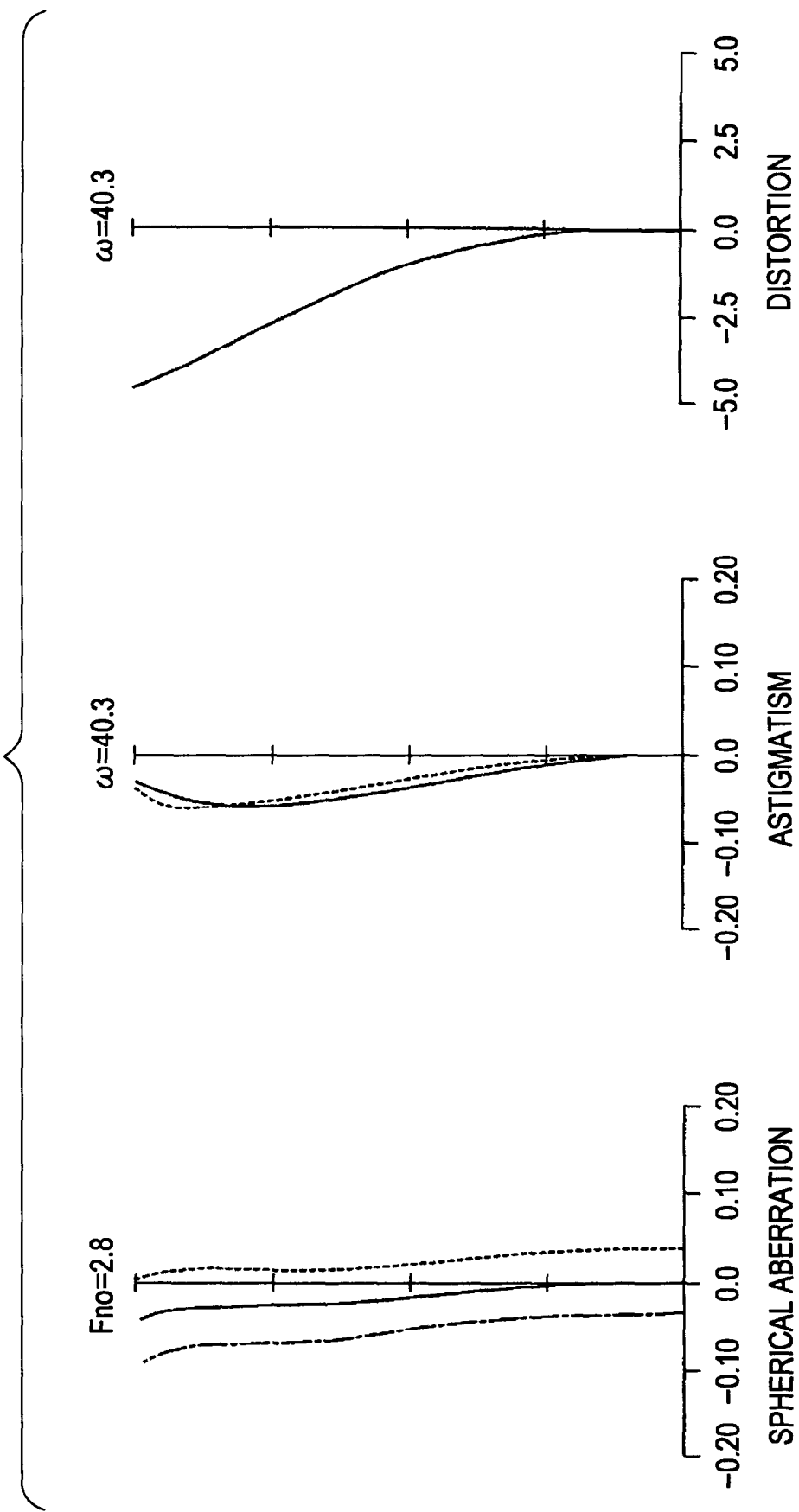
FIG. 2 are aberration diagrams of a numerical example to which specific numerical values are applied to the first embodiment together with FIGS. 3 and 4, and illustrates spherical aberration, astigmatism, and distortion at a wide-angle end.
Figure 3:
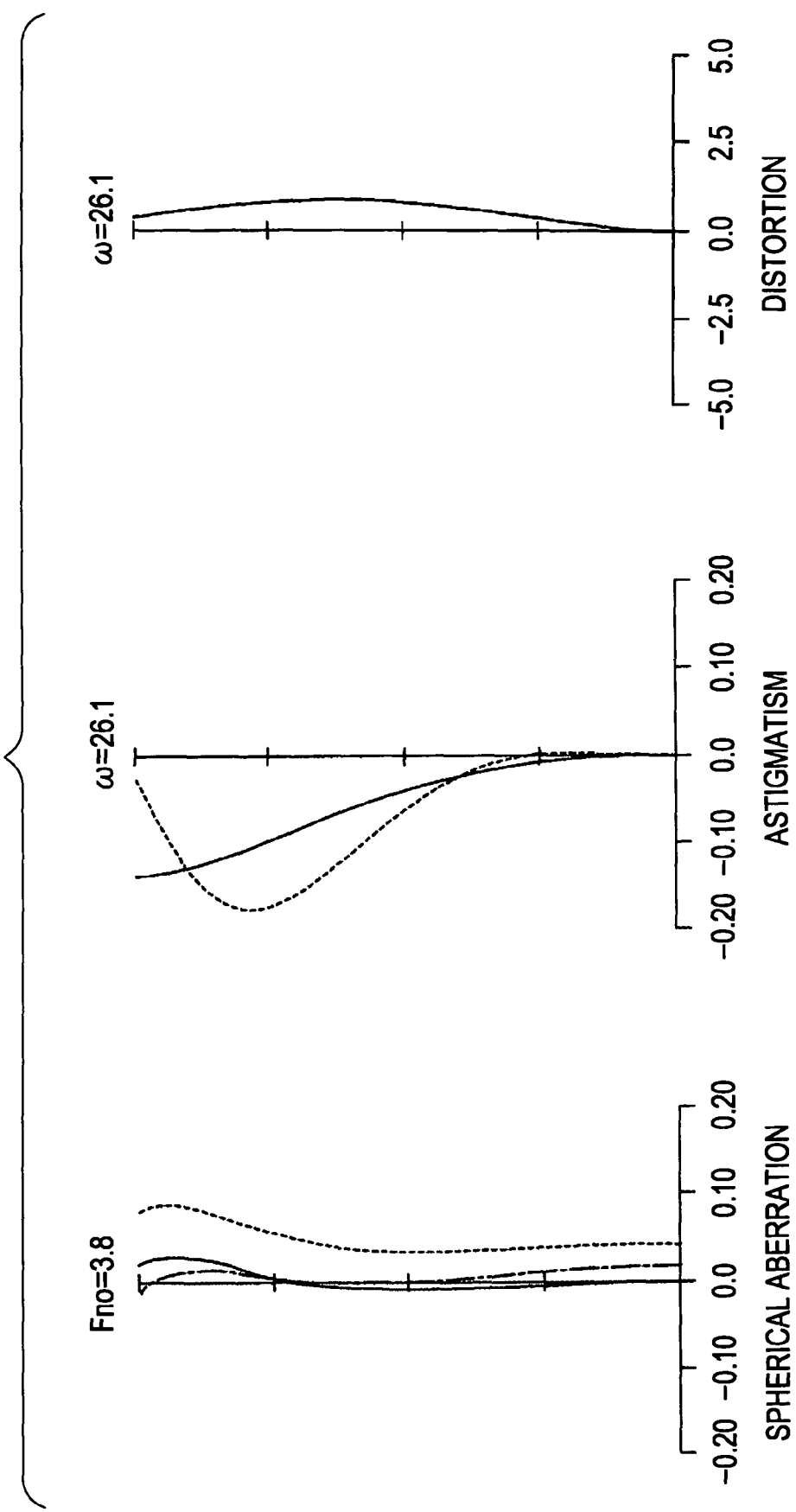
FIG. 3 illustrates spherical aberration, astigmatism, and distortion at an intermediate focal length.
Figure 4:
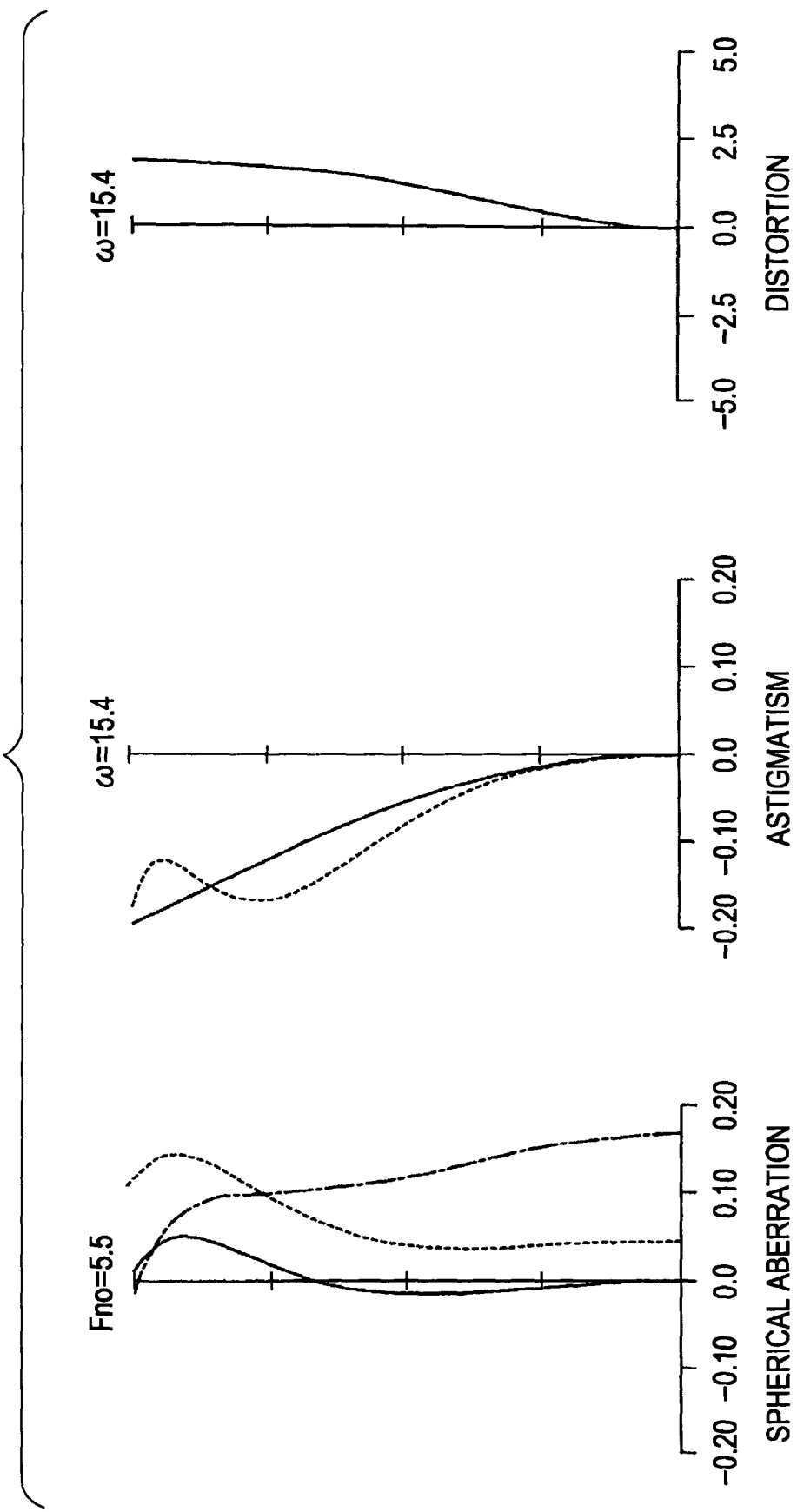
FIG. 4 illustrates spherical aberration, astigmatism, and distortion at a telephoto end.

FIGS. 2 to 4 show aberration diagrams at infinity according to Numerical Example 1. FIG. 2 illustrates aberration diagrams at the wide-angle end (focal length f=9.90). FIG. 3 illustrates aberration diagrams at the intermediate focal length (focal length f=16.3). FIG. 4 illustrates aberration diagrams at the telephoto end (focal length f=28.5).

In spherical aberration diagrams in FIGS. 2 to 4, the solid line represents a value at the d-line (wavelength: 587.6 nm), the dotted line represents a value at the c-line (wavelength 656.3 nm), and the dotted-chain line represents a value at the g-line (wavelength: 435.8 nm). In astigmatism aberration diagrams in FIGS. 2 to 4, the solid line represents a value at a sagittal image plane, and the broken line represents a value at a meridional image plane.

In the aberration diagrams, it is found that the aberration is properly corrected and a good image forming performance is provided in Numerical Example 1.

Figure 5:
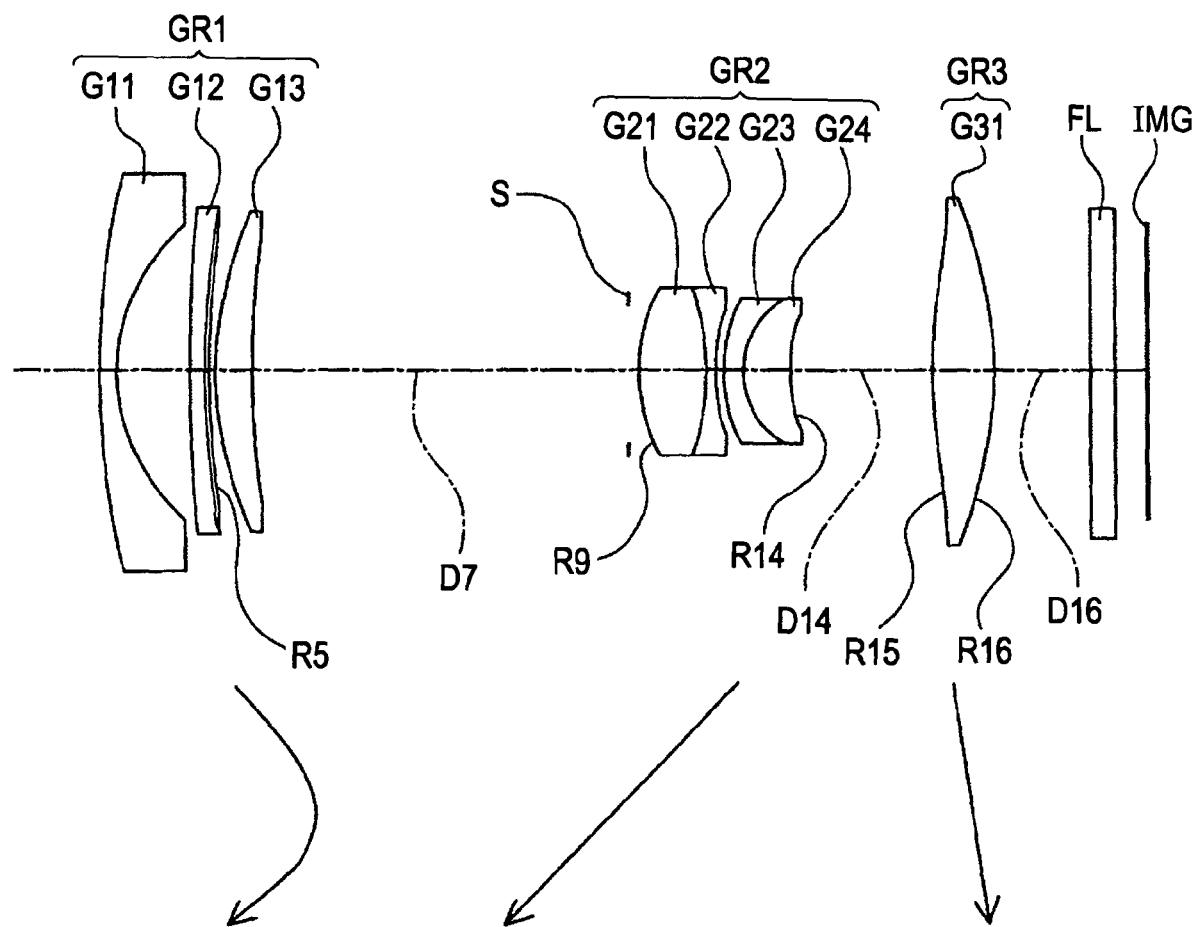
FIG. 5 illustrates a lens configuration of a zoom lens according to a second embodiment of the present invention.

FIG. 5 illustrates a lens configuration of a zoom lens 2 according to a second embodiment of the present invention.

The zoom lens 2 of the second embodiment includes eight lenses as shown in FIG. 5.

The zoom lens 2 includes a first lens group GR1 having a negative refractive power, a second lens group GR2 having a positive refractive power, and a third lens group GR3 having a positive refractive power, in that order from an object side to an image side.

In the zoom lens 2, the first lens group GR1, the second lens group GR2, and the third lens group GR3 are moved in an optical-axis direction during zooming between a wide-angle end and a telephoto end. For example, during zooming from the wide-angle end to the telephoto end, the first lens group GR1, the second lens group GR2, and the third lens group GR3 are moved in the optical-axis direction such that an air distance between the first lens group GR1 and the second lens group GR2 is decreased and an air distance between the second lens group GR2 and the third lens group GR3 is increased. In contrast, during zooming from the telephoto end to the wide-angle end, the first lens group GR1, the second lens group GR2, and the third lens group GR3 are moved in the optical-axis direction such that the air distance between the first lens group GR1 and the second lens group GR2 is increased and the air distance between the second lens group GR2 and the third lens group GR3 is decreased.

The first lens group GR1 includes a meniscus compound aspherical first lens G11 having a negative refractive power with its convex surface facing the object side, a meniscus second lens G12 having a negative refractive power with its convex surface facing the object side, and a meniscus third lens G13 having a positive refractive power with its convex surface facing the object side, in that order from the object side to the image side. An image-side surface of the second lens G12 is aspherical.

The second lens group GR2 includes a biconvex first lens G21 having a positive refractive power, a biconcave second lens G22 having a negative refractive power, a meniscus third lens G23 having a negative refractive power with its convex surface facing the object side, and a meniscus fourth lens G24 having a positive refractive power with its convex surface facing the object side, in that order from the object side to the image side. An object-side surface of the first lens G21 and an image-side surface of the fourth lens G24 are aspherical.

The first lens G21 and the second lens G22 form a cemented lens having a bonding surface R10, at which an image-side convex surface of the first lens G21 is bonded to an object-side concave surface of the second lens G22. The convex and concave surfaces have the same curvature radius.

The third lens G23 and the fourth lens G24 form a cemented lens having a bonding surface R13, at which an image-side concave surface of the third lens G23 is bonded to an object-side convex surface of the fourth lens G24. The concave and convex surfaces have the same curvature radius.

The third lens group GR3 includes a biconvex lens G31 having a positive refractive power. Both surfaces of the lens G31 are aspherical.

An aperture stop S (aperture stop surface R8) is arranged between the first lens group GR1 and the second lens group GR2.

A filter FL is arranged between the third lens group GR3 and an image plane IMG.

Table 4 shows lens data of Numerical Example 2 to which specific numerical values are applied to the zoom lens 2 according to the second embodiment.

TABLE 4

| Si | Ri | Di | Ni | vi |
|---|---|---|---|---|
| 1 | 45.000 | 0.950 | 1.88300 | 40.8 |
| 2 | 10.778 | 3.925 | | |
| 3 | 95.732 | 0.900 | 1.61800 | 63.4 |
| 4 | 46.766 | 0.100 | 1.53420 | 41.7 |
| 5 | 31.327 (ASP) | 0.413 | | |
| 6 | 20.386 | 2.080 | 1.84666 | 23.8 |
| 7 | 64.600 | D7 | | |
| 8 | Aperture stop | 0.500 | | |
| 9 | 9.481 (ASP) | 3.700 | 1.85135 | 40.1 |
| 10 | −13.389 | 0.500 | 1.63980 | 34.6 |
| 11 | 10.329 | 0.512 | | |

TABLE 4-continued

| Si | Ri | Di | Ni | vi |
|---|---|---|---|---|
| 12 | 8.945 | 1.084 | 2.00069 | 25.5 |
| 13 | 4.830 | 2.523 | 1.69350 | 53.2 |
| 14 | 9.468 (ASP) | D14 | | |
| 15 | 51.001 (ASP) | 3.214 | 1.61881 | 63.9 |
| 16 | −25.842 (ASP) | D16 | | |
| 17 | INF | 1.800 | 1.51872 | 64.2 |
| 18 | INF | | | |

In the zoom lens 2, an image-side surface (R5) of the second lens G12 of the first lens group GR1, an object-side surface (R9) of the first lens G21 of the second lens group GR2, an image-side surface (R14) of the fourth lens G24 of the second lens group GR2, an object-side surface (R15) of the lens G31 of the third lens group GR3, and an image-side surface (R16) of the lens G31 of the third lens group GR3 are aspherical. Table 2 shows aspherical coefficients A4, A6, A8, and A10 of 4th, 6th, 8th, and 10th orders of the aspherical surfaces of Numerical Example 2, together with conic constants K.

TABLE 5

| Si | K | A4 | A6 | A8 | A10 |
|---|---|---|---|---|---|
| 5 | 0.00000E+00 | −5.20571E−05 | −4.43073E−07 | 3.52326E−09 | −6.13429E−11 |
| 9 | 0.00000E+00 | −7.83861E−05 | −9.26710E−07 | −3.54268E−08 | 4.58833E−10 |
| 14 | 0.00000E+00 | 3.32744E−04 | 6.93988E−06 | −4.19631E−07 | 6.01372E−09 |
| 15 | 0.00000E+00 | 4.36838E−06 | −2.98027E−08 | −2.62534E−09 | 0 |
| 16 | 0.00000E+00 | 5.91910E−05 | −8.95904E−07 | 6.71784E−09 | −4.04600E−11 |

In the zoom lens 2, during zooming between the wide-angle end and the telephoto end, a surface distance D7 between the first lens group GR1 and the second lens group GR2, a surface distance D14 between the second lens group GR2 and the third lens group GR3, and a surface distance D16 between the third lens group GR3 and the filter FL are variable. Table 6 shows variable distances of surface distances at the wide-angle end (focal length f=10.66), the intermediate focal length (focal length f=17.95), and the telephoto end (focal length f=30.63) in Numerical Example 2, together with F-numbers Fno and half view angles ω.

TABLE 6

| Fno | 2.88 | 3.9 | 5.5 |
|---|---|---|---|
| f | 10.66 | 17.95 | 30.63 |
| ω | 38.19 | 24.01 | 14.56 |
| D7 | 22.331 | 9.736 | 2.600 |
| D14 | 7.645 | 16.612 | 29.375 |
| D16 | 5.214 | 3.955 | 3.094 |

Figure 6:
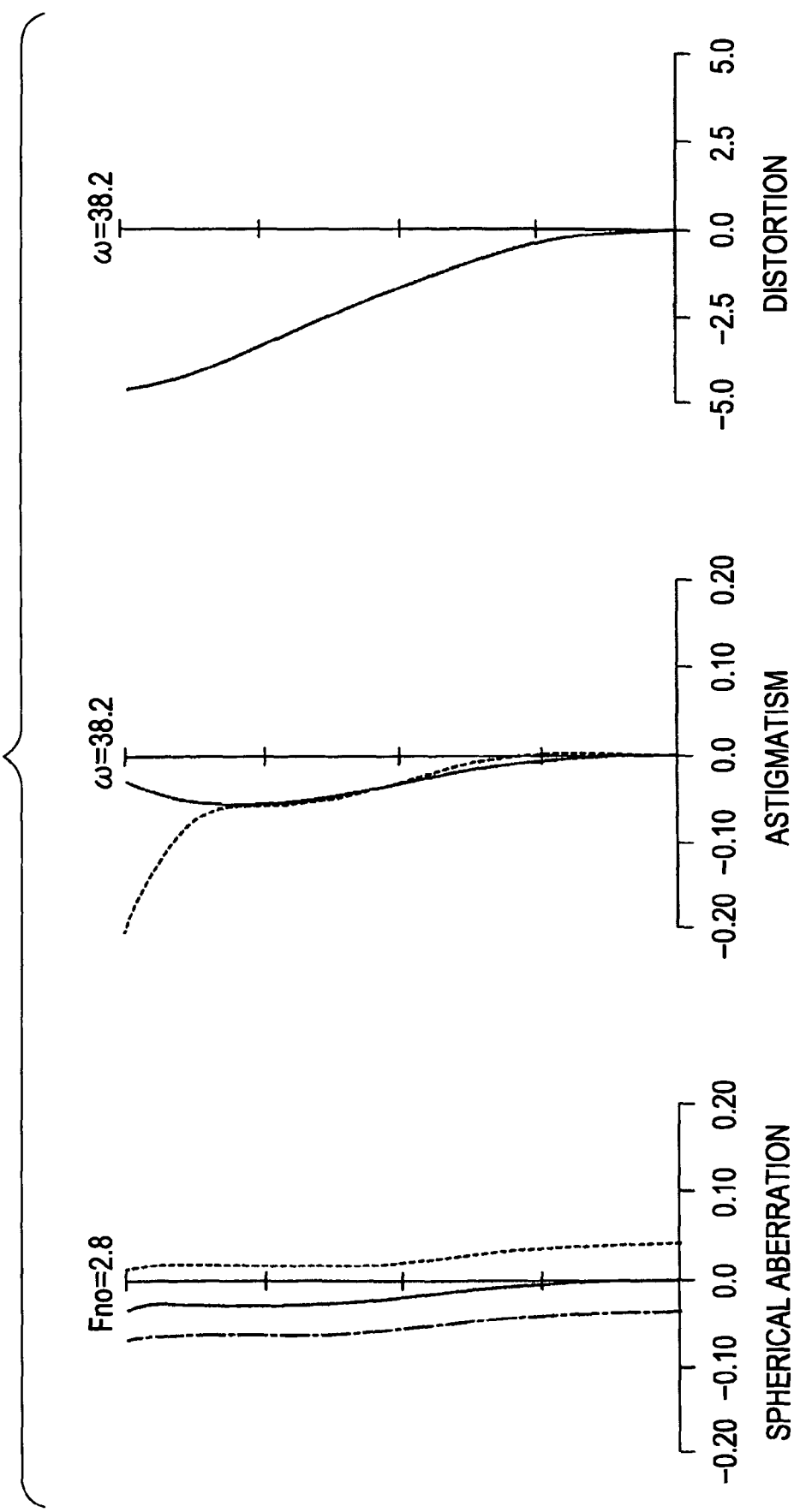
FIG. 6 are aberration diagrams of a numerical example to which specific numerical values are applied to the second embodiment together with FIGS. 7 and 8, and illustrates spherical aberration, astigmatism, and distortion at a wide-angle end.
Figure 7:
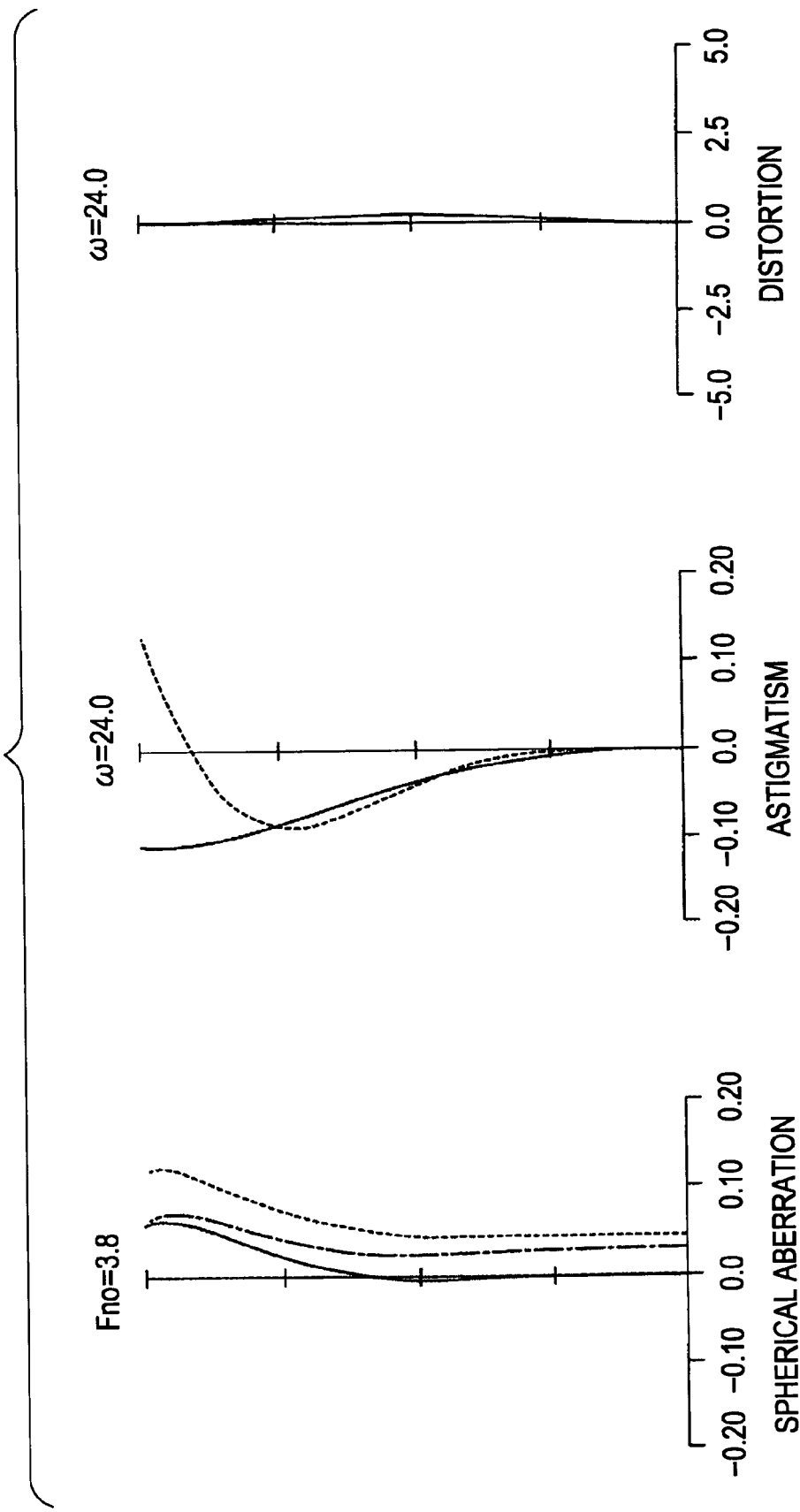
FIG. 7 illustrates spherical aberration, astigmatism, and distortion at an intermediate focal length.
Figure 8:
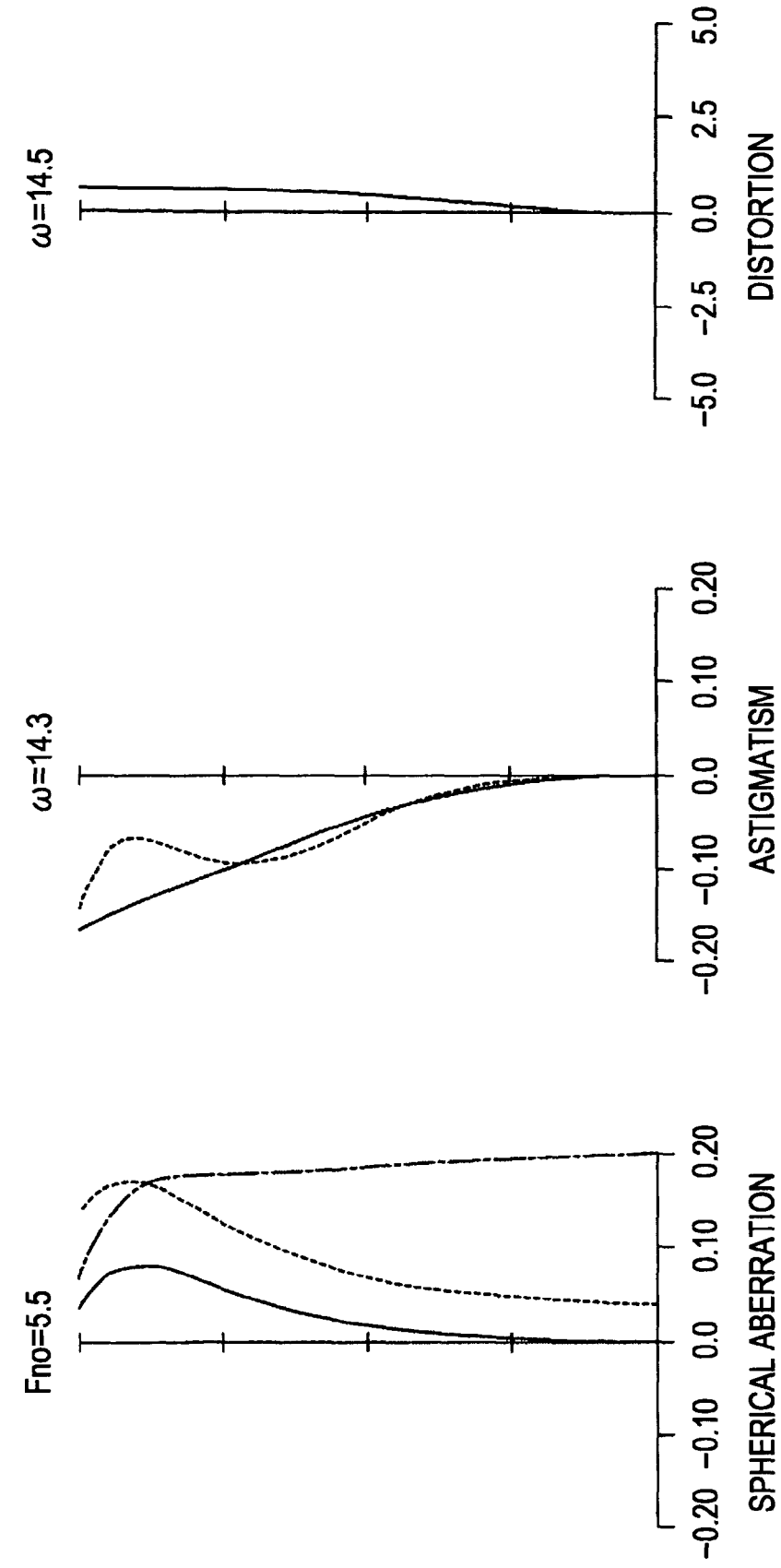
FIG. 8 illustrates spherical aberration, astigmatism, and distortion at a telephoto end.

FIGS. 6 to 8 show aberration diagrams at infinity according to Numerical Example 2. FIG. 6 illustrates aberration diagrams at the wide-angle end (focal length f=10.66). FIG. 7 illustrates aberration diagrams at the intermediate focal length (focal length f=17.95). FIG. 8 illustrates aberration diagrams at the telephoto end (focal length f=30.63).

In spherical aberration diagrams in FIGS. 6 to 8, the solid line represents a value at the d-line (wavelength: 587.6 nm), the dotted line represents a value at the c-line (wavelength 656.3 nm), and the dotted-chain line represents a value at the g-line (wavelength: 435.8 nm). In astigmatism aberration diagrams in FIGS. 6 to 8, the solid line represents a value at a sagittal image plane, and the broken line represents a value at a meridional image plane.

In the aberration diagrams, it is found that the aberration is properly corrected and a good image forming performance is provided in Numerical Example 2.

Figure 9:
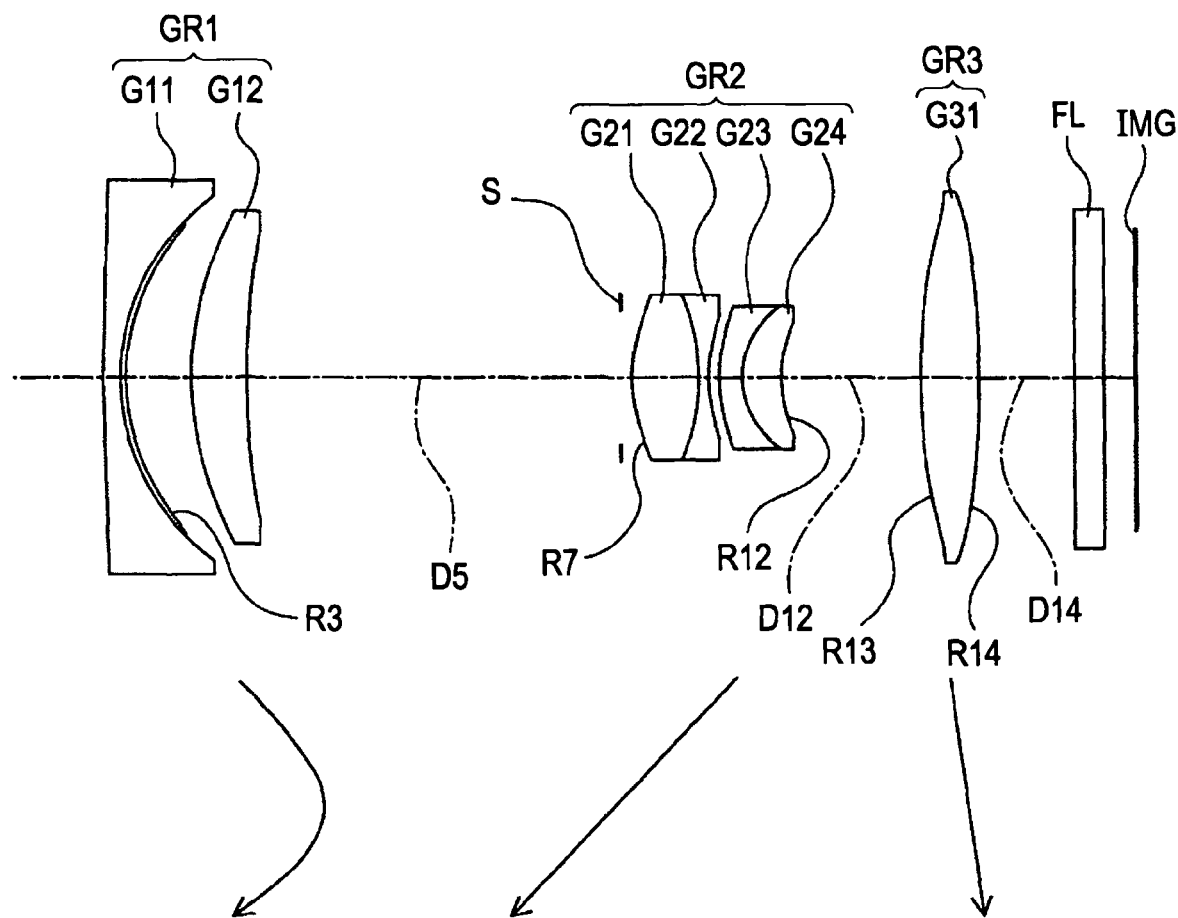
FIG. 9 illustrates a lens configuration of a zoom lens according to a third embodiment of the present invention.

FIG. 9 illustrates a lens configuration of a zoom lens 3 according to a third embodiment of the present invention.

The zoom lens 3 of the third embodiment includes seven lenses as shown in FIG. 9.

The zoom lens 3 includes a first lens group GR1 having a negative refractive power, a second lens group GR2 having a positive refractive power, and a third lens group GR3 having a positive refractive power, in that order from an object side to an image side.

In the zoom lens 3, the first lens group GR1, the second lens group GR2, and the third lens group GR3 are moved in an optical-axis direction during zooming between a wide-angle end and a telephoto end. For example, during zooming from the wide-angle end to the telephoto end, the first lens group GR1, the second lens group GR2, and the third lens group GR3 are moved in the optical-axis direction such that an air distance between the first lens group GR1 and the second lens group GR2 is decreased and an air distance between the second lens group GR2 and the third lens group GR3 is increased. In contrast, during zooming from the telephoto end to the wide-angle end, the first lens group GR1, the second lens group GR2, and the third lens group GR3 are moved in the optical-axis direction such that the air distance between the first lens group GR1 and the second lens group GR2 is increased and the air distance between the second lens group GR2 and the third lens group GR3 is decreased.

The first lens group GR1 includes a meniscus compound aspherical first lens G11 having a negative refractive power with its convex surface facing the object side, and a meniscus second lens G12 having a positive refractive power with its convex surface facing the object side, in that order from the object side to the image side. An image-side surface of the first lens G11 is aspherical.

The second lens group GR2 includes a biconvex first lens G21 having a positive refractive power, a biconcave second lens G22 having a negative refractive power, a meniscus third lens G23 having a negative refractive power with its convex surface facing the object side, and a meniscus fourth lens G24 having a positive refractive power with its convex surface facing the object side, in that order from the object side to the image side. An object-side surface of the first lens G21 and an image-side surface of the fourth lens G24 are aspherical.

The first lens G21 and the second lens G22 form a cemented lens having a bonding surface R8, at which an image-side convex surface of the first lens G21 is bonded to an object-side concave surface of the second lens G22. The convex and concave surfaces have the same curvature radius.

The third lens G23 and the fourth lens G24 form a cemented lens having a bonding surface R11, at which an image-side concave surface of the third lens G23 is bonded to an object-side convex surface of the fourth lens G24. The concave and convex surfaces have the same curvature radius.

The third lens group GR3 includes a biconvex lens G31 having a positive refractive power. Both surfaces of the lens G31 are aspherical.

An aperture stop S (aperture stop surface R6) is arranged between the first lens group GR1 and the second lens group GR2.

A filter FL is arranged between the third lens group GR3 and an image plane IMG.

Table 7 shows lens data of Numerical Example 3 to which specific numerical values are applied to the zoom lens 3 according to the third embodiment.

TABLE 7

| Si | Ri | Di | Ni | vi |
|---|---|---|---|---|
| 1 | 245.177 | 0.950 | 1.88830 | 40.8 |
| 2 | 12.180 | 0.100 | 1.53420 | 41.7 |
| 3 | 10.537 (ASP) | 3.630 | | |
| 4 | 18.609 | 3.000 | 1.84666 | 23.8 |
| 5 | 53.037 | D5 | | |
| 6 | Aperture stop | 0.500 | | |
| 7 | 9.385 (ASP) | 3.617 | 1.85135 | 40.1 |
| 8 | −12.166 | 0.636 | 1.63980 | 34.6 |
| 9 | 11.213 | 0.474 | | |
| 10 | 9.780 | 1.238 | 2.00069 | 25.5 |
| 11 | 4.830 | 2.135 | 1.69350 | 53.2 |
| 12 | 9.439 (ASP) | D13 | | |
| 13 | 39.886 (ASP) | 3.360 | 1.69350 | 53.2 |
| 14 | −30.752 (ASP) | D15 | | |
| 15 | INF | 1.800 | 1.51872 | 64.2 |
| 16 | INF | | | |

In the zoom lens 3, an image-side surface (R3) of the first lens G11 of the first lens group GR1, an object-side surface (R7) of the first lens G21 of the second lens group GR2, an image-side surface (R12) of the fourth lens G24 of the second lens group GR2, an object-side surface (R13) of the lens G31 of the third lens group GR3, and an image-side surface (R14) of the lens G31 of the third lens group GR3 are aspherical. Table 8 shows aspherical coefficients A4, A6, A8, and A10 of 4th, 6th, 8th, and 10th orders of the aspherical surfaces of Numerical Example 3, together with conic constants K.

TABLE 8

| Si | K | A4 | A6 | A8 | A10 |
|---|---|---|---|---|---|
| 3 | 0.00000E+00 | −1.20163E−04 | −2.68470E−07 | −2.92205E−09 | −5.80228E−11 |
| 7 | 0.00000E+00 | −1.03215E−04 | −4.05742E−07 | −8.95031E−08 | 1.77523E−09 |
| 12 | 0.00000E+00 | 2.76128E−04 | 1.26262E−05 | −1.12894E−06 | 3.27515E−08 |
| 13 | 0.00000E+00 | 7.91571E−05 | −1.51823E−07 | −3.56747E−09 | −1.73138E−11 |
| 14 | 0.00000E+00 | 1.60709E−04 | −9.84738E−07 | −3.08422E−09 | 1.65006E−12 |

In the zoom lens 3, during zooming between the wide-angle end and the telephoto end, a surface distance D5 between the first lens group GR1 and the second lens group GR2, a surface distance D12 between the second lens group GR2 and the third lens group GR3, and a surface distance D14 between the third lens group GR3 and the filter FL are variable. Table 9 shows variable distances of surface distances at the wide-angle end (focal length f=10.67), the intermediate focal length (focal length f=18.17), and the telephoto end (focal length f=30.73) in Numerical Example 3, together with F-numbers Fno and half view angles ω.

TABLE 9

| Fno | 2.88 | 3.88 | 5.55 |
|---|---|---|---|
| f | 10.67 | 18.17 | 30.73 |
| ω | 38.26 | 23.71 | 14.45 |
| D5 | 20.035 | 8.568 | 2.000 |
| D12 | 7.244 | 15.961 | 29.162 |
| D14 | 5.200 | 4.571 | 3.192 |

Figure 10:
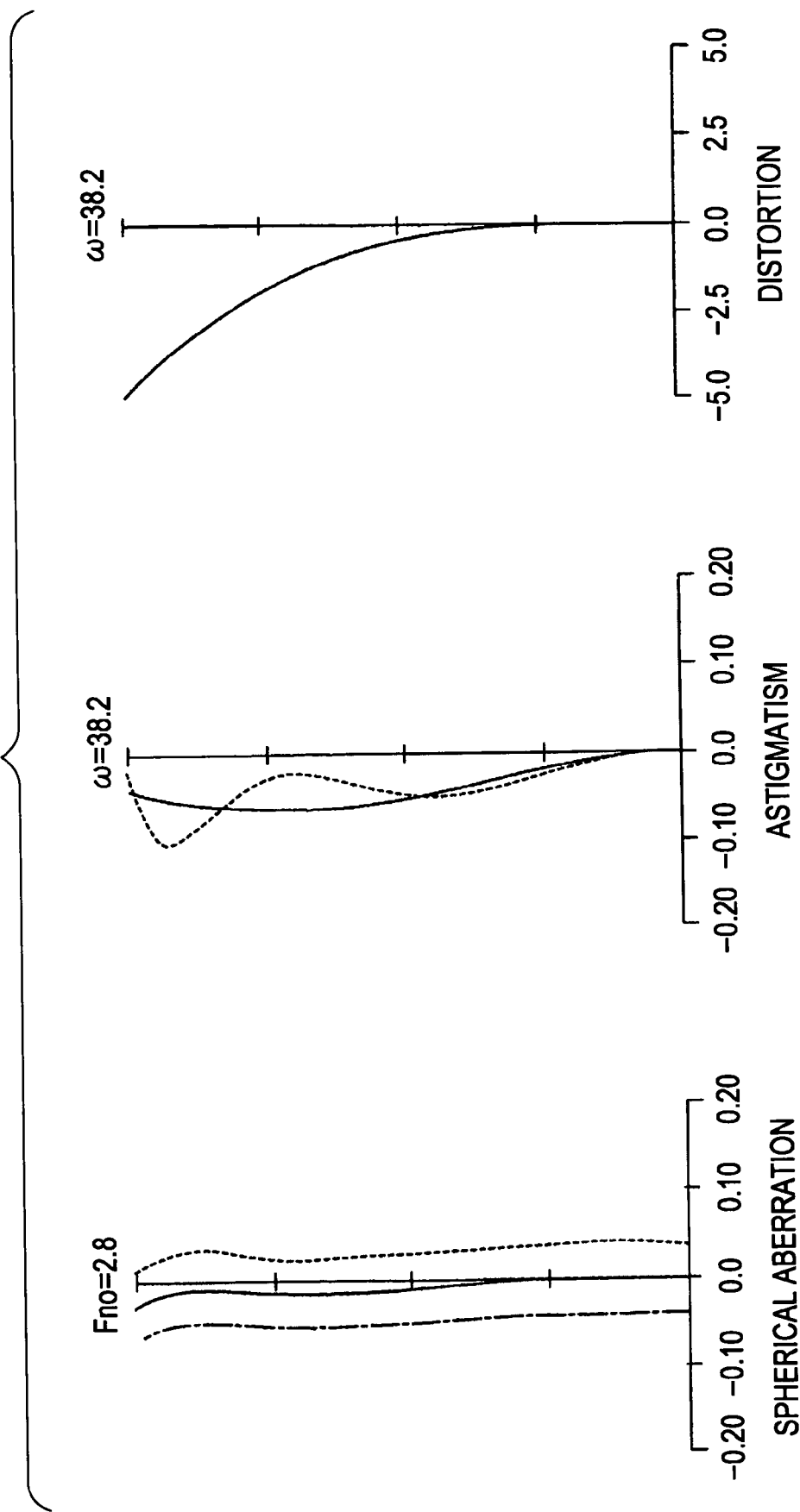
FIG. 10 are aberration diagrams of a numerical example to which specific numerical values are applied to the third embodiment together with FIGS. 11 and 12, and illustrates spherical aberration, astigmatism, and distortion at a wide-angle end.
Figure 11:
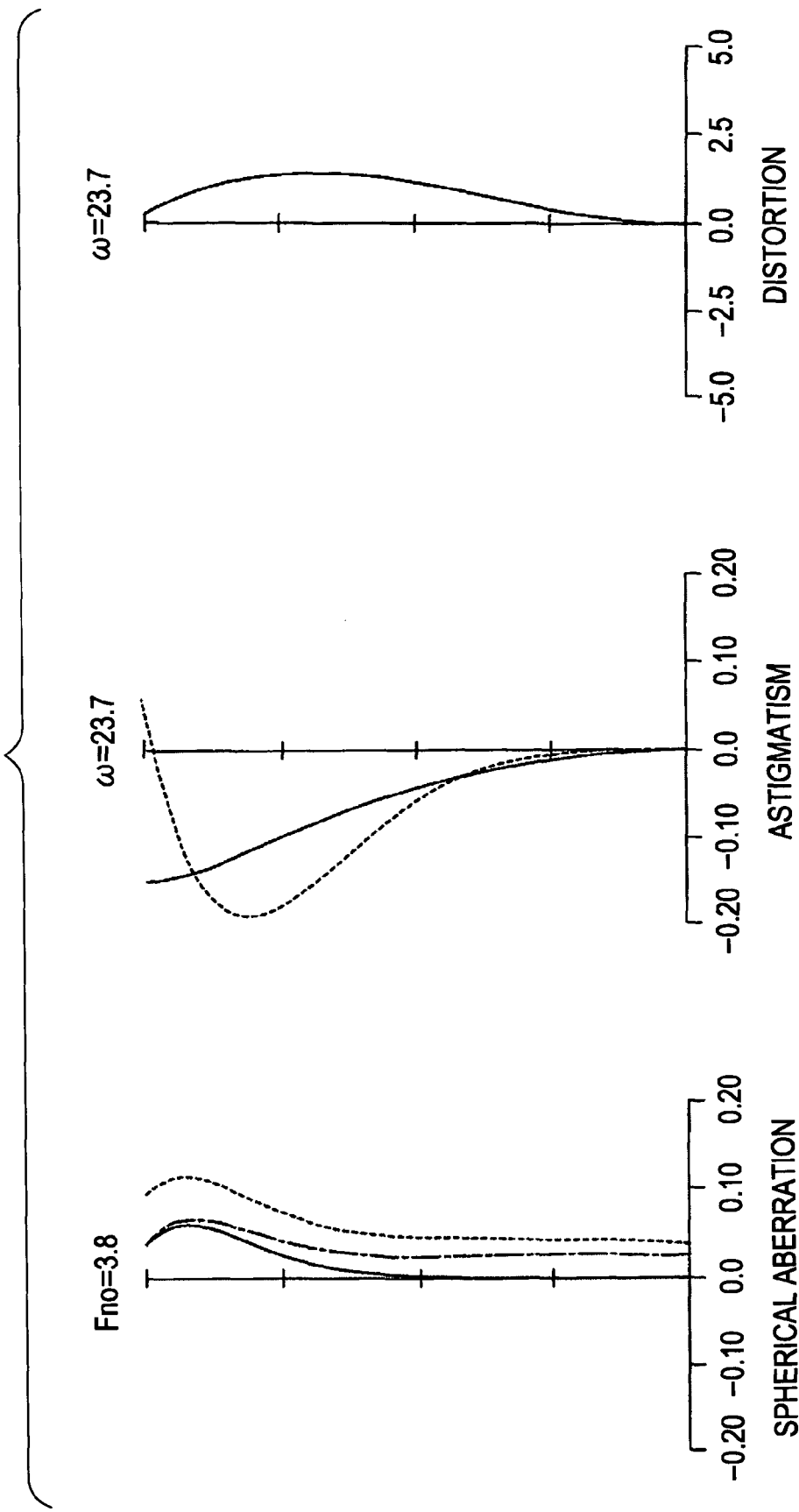
FIG. 11 illustrates spherical aberration, astigmatism, and distortion at an intermediate focal length.
Figure 12:
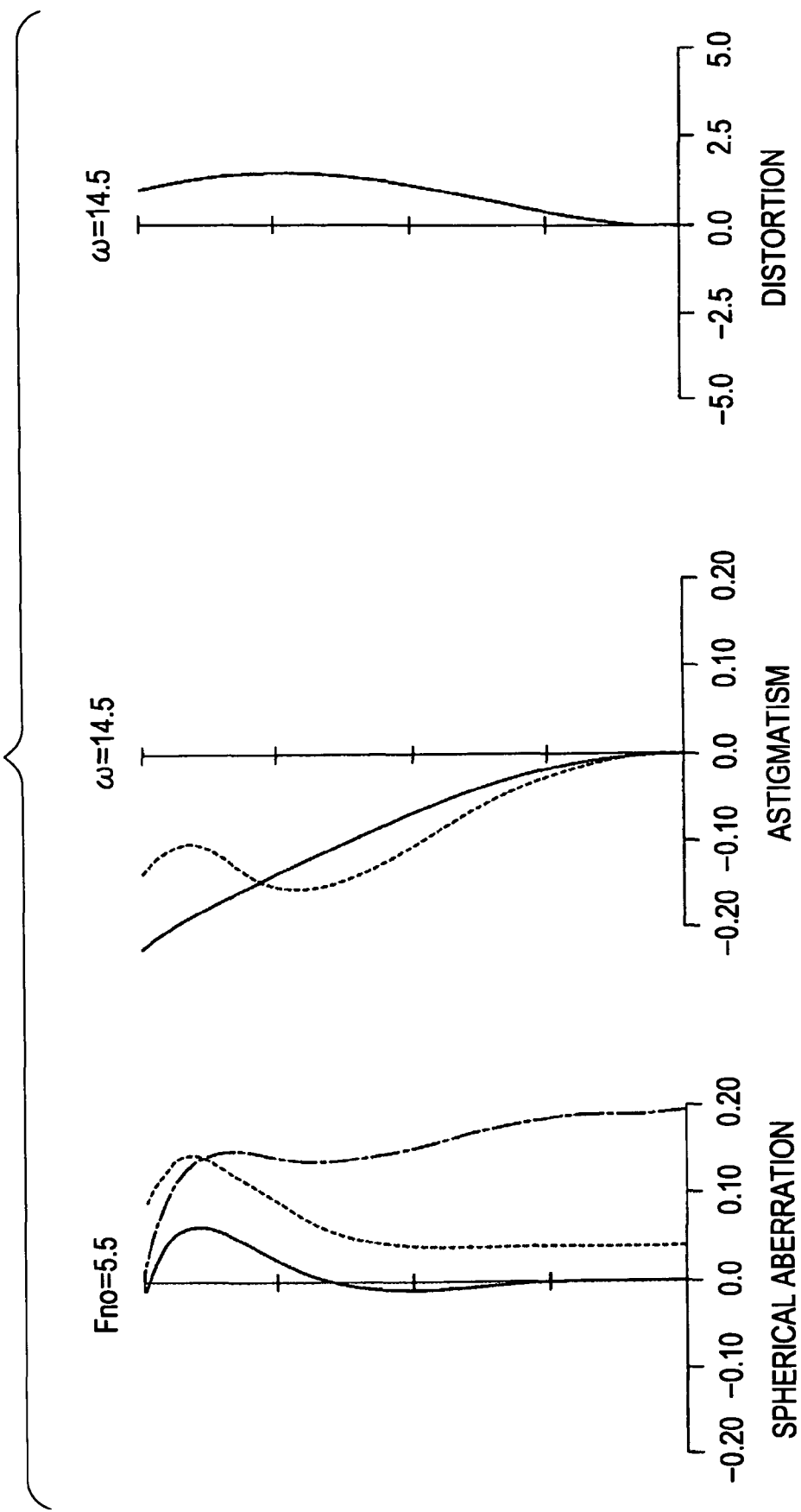
FIG. 12 illustrates spherical aberration, astigmatism, and distortion at a telephoto end.

FIGS. 10 to 12 show aberration diagrams at infinity according to Numerical Example 3. FIG. 10 illustrates aberration diagrams at the wide-angle end (focal length f=10.67). FIG. 11 illustrates aberration diagrams at the intermediate focal length (focal length f=18.17). FIG. 12 illustrates aberration diagrams at the telephoto end (focal length f=30.73).

In spherical aberration diagrams in FIGS. 10 to 12, the solid line represents a value at the d-line (wavelength: 587.6 nm), the dotted line represents a value at the c-line (wavelength 656.3 nm), and the dotted-chain line represents a value at the g-line (wavelength: 435.8 nm). In astigmatism aberration diagrams in FIGS. 10 to 12, the solid line represents a value at a sagittal image plane, and the broken line represents a value at a meridional image plane.

In the aberration diagrams, it is found that the aberration is properly corrected and a good image forming performance is provided in Numerical Example 3.

Figure 13:
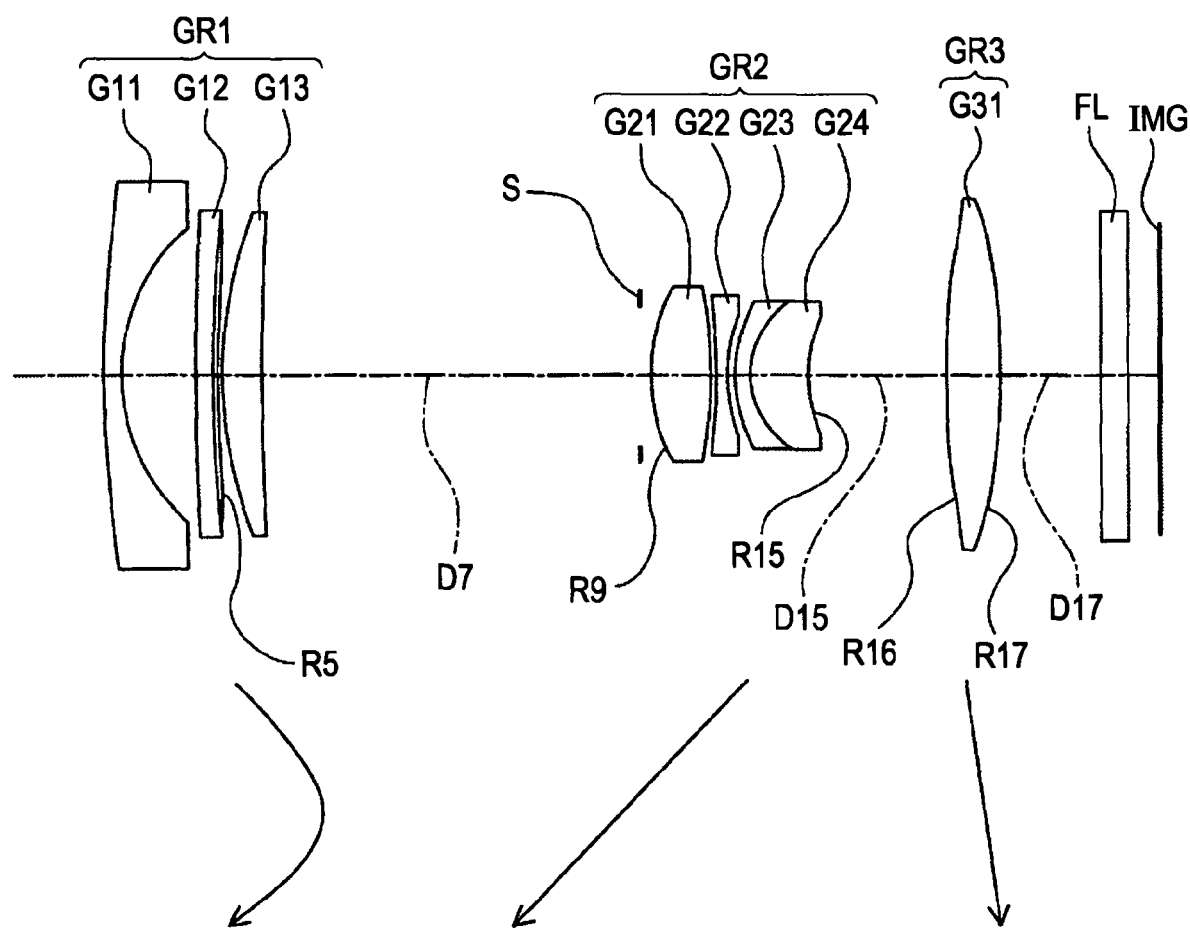
FIG. 13 illustrates a lens configuration of a zoom lens according to a fourth embodiment of the present invention.

FIG. 13 illustrates a lens configuration of a zoom lens 4 according to a fourth embodiment of the present invention.

The zoom lens 4 of the fourth embodiment includes eight lenses as shown in FIG. 13.

The zoom lens 4 includes a first lens group GR1 having a negative refractive power, a second lens group GR2 having a positive refractive power, and a third lens group GR3 having a positive refractive power, in that order from an object side to an image side.

In the zoom lens 4, the first lens group GR1, the second lens group GR2, and the third lens group GR3 are moved in an optical-axis direction during zooming between a wide-angle end and a telephoto end. For example, during zooming from the wide-angle end to the telephoto end, the first lens group GR1, the second lens group GR2, and the third lens group GR3 are moved in the optical-axis direction such that an air distance between the first lens group GR1 and the second lens group GR2 is decreased and an air distance between the second lens group GR2 and the third lens group GR3 is increased. In contrast, during zooming from the telephoto end to the wide-angle end, the first lens group GR1, the second lens group GR2, and the third lens group GR3 are moved in the optical-axis direction such that the air distance between the first lens group GR1 and the second lens group GR2 is increased and the air distance between the second lens group GR2 and the third lens group GR3 is decreased.

The first lens group GR1 includes a meniscus first lens G11 having a negative refractive power with its convex surface facing the object side, a meniscus compound aspherical second lens G12 having a negative refractive power with its convex surface facing the object side, and a meniscus third lens G13 having a positive refractive power with its convex surface facing the object side, in that order from the object side to the image side. An image-side surface of the second lens G12 is aspherical.

The second lens group GR2 includes a biconvex first lens G21 having a positive refractive power, a biconcave second lens G22 having a negative refractive power, a meniscus third lens G23 having a negative refractive power with its convex surface facing the object side, and a meniscus fourth lens G24 having a positive refractive power with its convex surface facing the object side, in that order from the object side to the image side. An object-side surface of the first lens G21 and an image-side surface of the fourth lens G24 are aspherical.

The third lens G23 and the fourth lens G24 form a cemented lens having a bonding surface R14, at which an image-side concave surface of the third lens G23 is bonded to an object-side convex surface of the fourth lens G24. The concave and convex surfaces have the same curvature radius.

The third lens group GR3 includes a biconvex lens G31 having a positive refractive power. Both surfaces of the lens G31 are aspherical.

An aperture stop S (aperture stop surface R8) is arranged between the first lens group GR1 and the second lens group GR2.

A filter FL is arranged between the third lens group GR3 and an image plane IMG.

Table 10 shows lens data of Numerical Example 4 to which specific numerical values are applied to the zoom lens 4 according to the fourth embodiment.

TABLE 10

| Si | Ri | Di | Ni | vi |
|---|---|---|---|---|
| 1 | 58.332 | 0.950 | 1.88830 | 40.8 |
| 2 | 10.997 | 4.007 | | |
| 3 | 164.246 | 1.000 | 1.61800 | 63.4 |
| 4 | 91.238 | 0.100 | 1.53420 | 41.7 |
| 5 | 43.404 (ASP) | 0.320 | | |
| 6 | 25.503 | 2.034 | 1.84666 | 23.8 |
| 7 | 149.040 | D7 | | |
| 8 | Aperture stop | 0.500 | | |
| 9 | 9.196 (ASP) | 3.345 | 1.83944 | 42.7 |
| 10 | −25.064 | 0.300 | | |
| 11 | −20.983 | 0.453 | 1.63980 | 34.6 |
| 12 | 10.501 | 0.408 | | |
| 13 | 8.812 | 0.794 | 2.00069 | 25.5 |
| 14 | 4.830 | 3.200 | 1.69350 | 53.2 |
| 15 | 10.311 (ASP) | D15 | | |
| 16 | 49.670 (ASP) | 2.989 | 1.58547 | 59.5 |
| 17 | −27.741 (ASP) | D17 | | |
| 18 | INF | 1.800 | 1.51872 | 64.2 |
| 19 | INF | | | |

In the zoom lens 4, an image-side surface (R5) of the second lens G12 of the first lens group GR1, an object-side surface (R9) of the first lens G21 of the second lens group GR2, an image-side surface (R15) of the fourth lens G24 of the second lens group GR2, an object-side surface (R16) of the lens G31 of the third lens group GR3, and an image-side surface (R17) of the lens G31 of the third lens group GR3 are aspherical. Table 11 shows aspherical coefficients A4, A6, A8, and A10 of 4th, 6th, 8th, and 10th orders of the aspherical surfaces of Numerical Example 4, together with conic constants K.

TABLE 11

| Si | K | A4 | A6 | A8 | A10 |
|---|---|---|---|---|---|
| 5 | 0.00000E+00 | −6.13061E−05 | −2.90090E−07 | 1.57087E−09 | −4.63598E−11 |
| 9 | 0.00000E+00 | −3.63853E−05 | −4.02378E−07 | −3.26016E−08 | 6.80087E−10 |
| 15 | 0.00000E+00 | 4.29632E−04 | 2.55415E−06 | 1.63782E−07 | −4.92902E−09 |
| 16 | 0.00000E+00 | 5.37906E−05 | −3.64063E−07 | −7.30974E−10 | −2.27081E−11 |
| 17 | 0.00000E+00 | 1.32849E−04 | −1.34487E−06 | 5.87006E−09 | −4.26151E−11 |

In the zoom lens 4, during zooming between the wide-angle end and the telephoto end, a surface distance D7 between the first lens group GR1 and the second lens group GR2, a surface distance D15 between the second lens group GR2 and the third lens group GR3, and a surface distance D17 between the third lens group GR3 and the filter FL are variable. Table 12 shows variable distances of surface distances at the wide-angle end (focal length f=10.67), the intermediate focal length (focal length f=17.87), and the telephoto end (focal length f=30.72) in Numerical Example 4, together with F-numbers Fno and half view angles ω.

TABLE 12

| Fno | 2.90 | 3.87 | 5.60 |
|---|---|---|---|
| f | 10.67 | 17.87 | 30.72 |
| ω | 38.20 | 23.99 | 14.39 |
| D7 | 20.382 | 9.281 | 2.600 |
| D15 | 7.261 | 15.657 | 29.349 |
| D17 | 5.427 | 4.697 | 2.941 |

Figure 14:
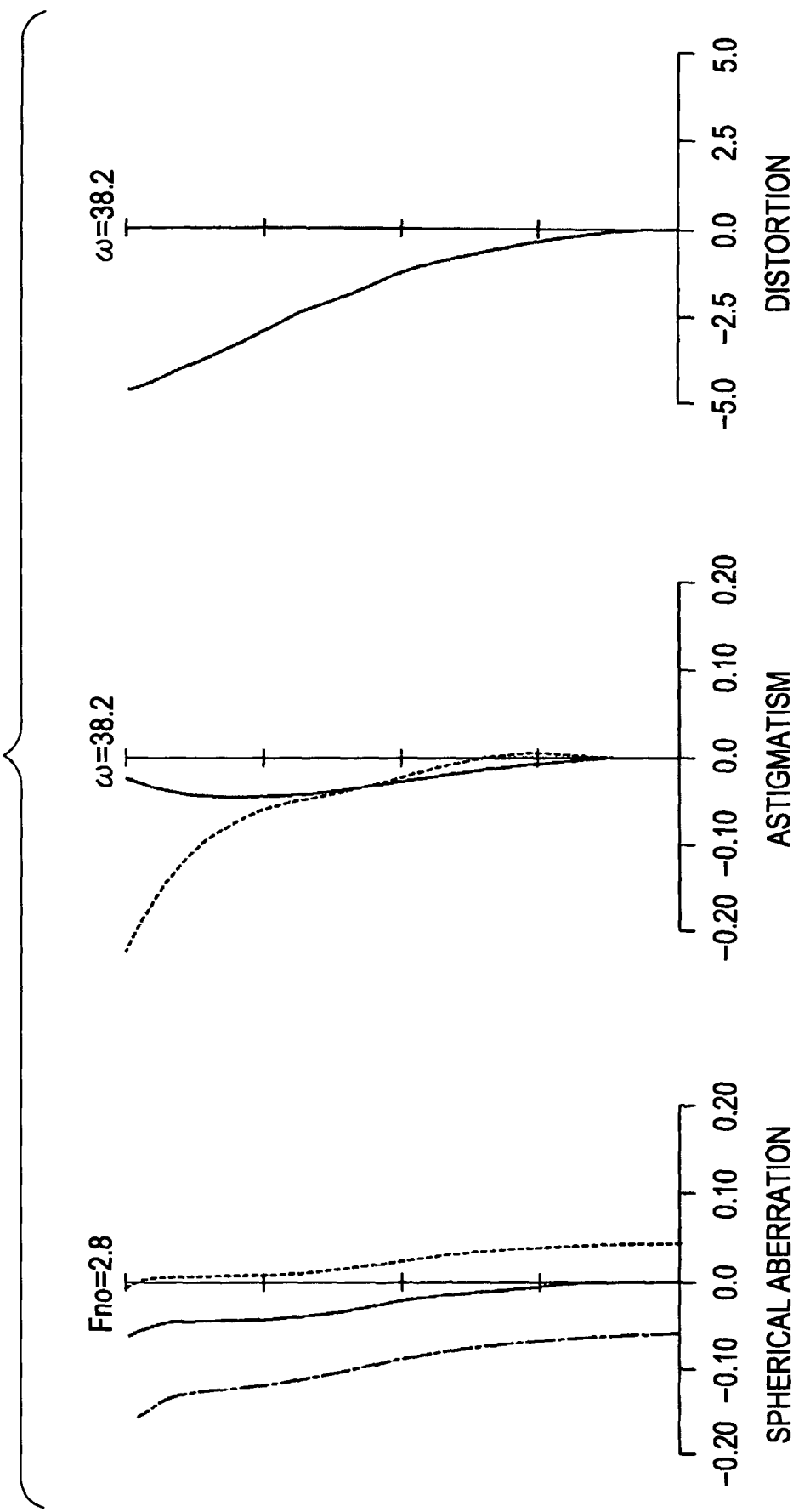
FIG. 14 are aberration diagrams of a numerical example to which specific numerical values are applied to the fourth embodiment together with FIGS. 15 and 16, and illustrates spherical aberration, astigmatism, and distortion at a wide-angle end.
Figure 15:
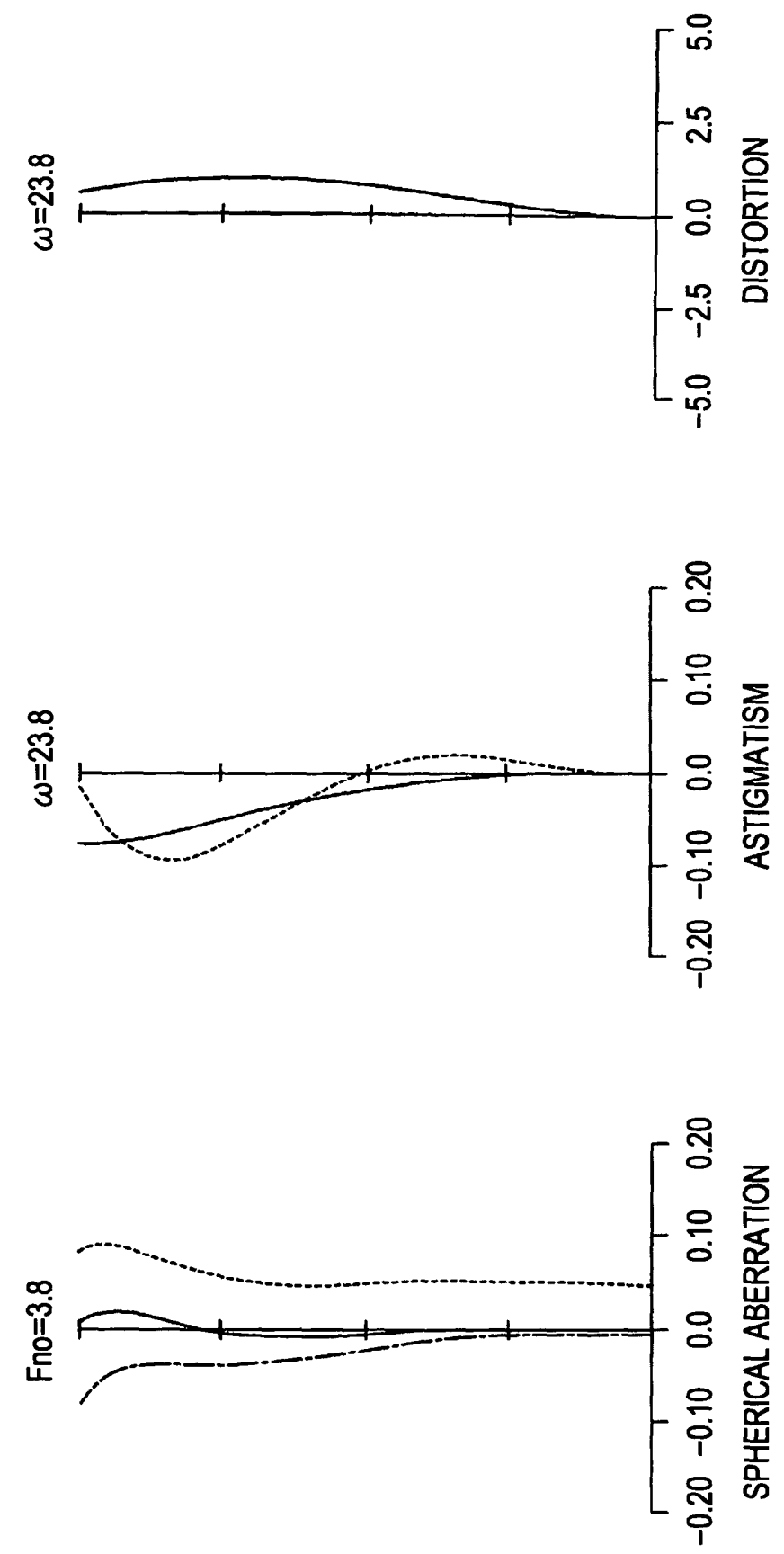
FIG. 15 illustrates spherical aberration, astigmatism, and distortion at an intermediate focal length.
Figure 16:
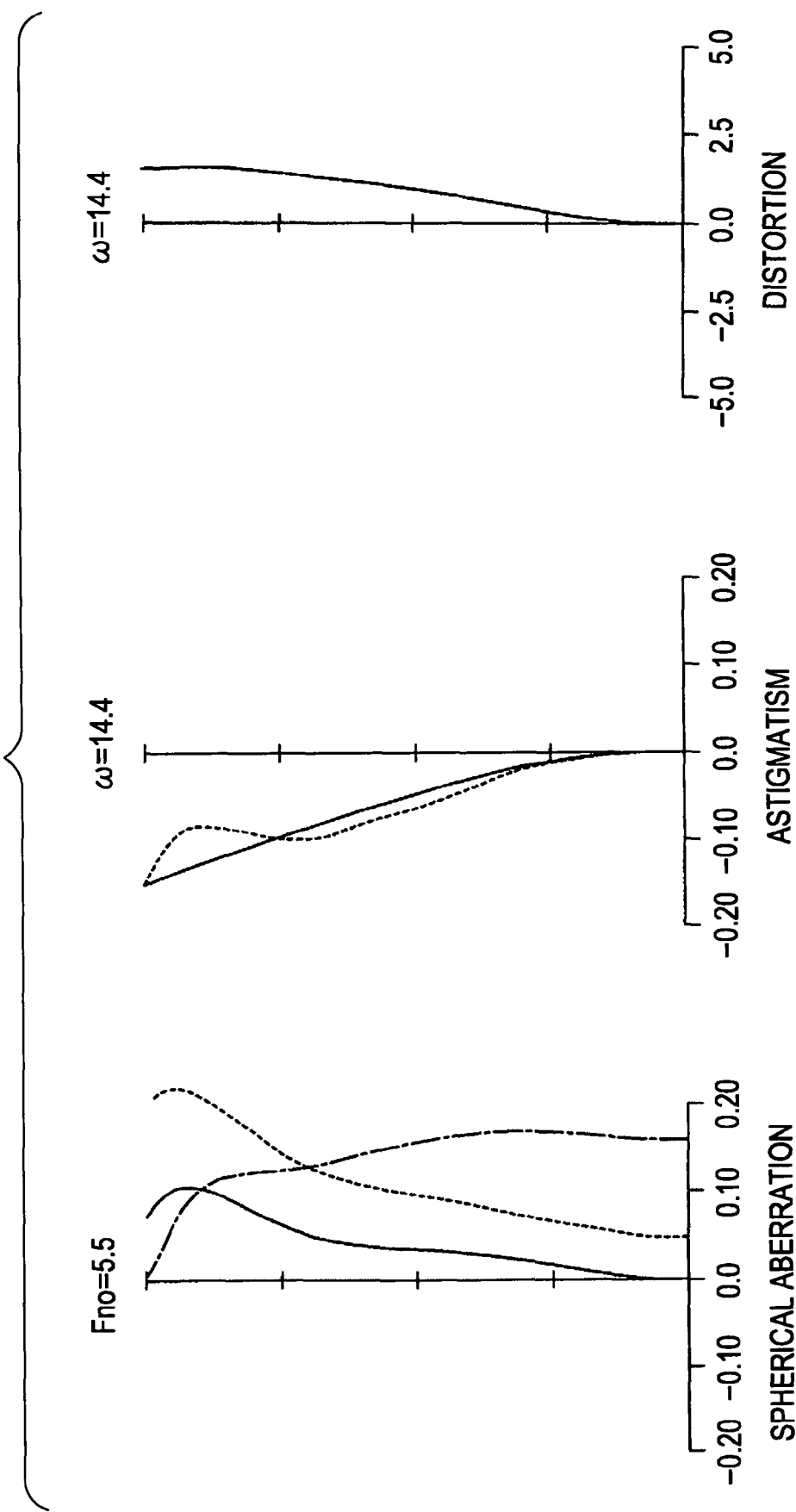
FIG. 16 illustrates spherical aberration, astigmatism, and distortion at a telephoto end.

FIGS. 14 to 16 show aberration diagrams at infinity according to Numerical Example 4. FIG. 14 illustrates aberration diagrams at the wide-angle end (focal length f=10.67). FIG. 15 illustrates aberration diagrams at the intermediate focal length (focal length f=17.87). FIG. 16 illustrates aberration diagrams at the telephoto end (focal length f=30.72).

In spherical aberration diagrams in FIGS. 14 to 16, the solid line represents a value at the d-line (wavelength: 587.6 nm), the dotted line represents a value at the c-line (wavelength 656.3 nm), and the dotted-chain line represents a value at the g-line (wavelength: 435.8 nm). In astigmatism aberration diagrams in FIGS. 14 to 16, the solid line represents a value at a sagittal image plane, and the broken line represents a value at a meridional image plane.

In the aberration diagrams, it is found that the aberration is properly corrected and a good image forming performance is provided in Numerical Example 4.

Table 13 shows values of Conditional Expressions (1) to (3) respectively for the zoom lenses 1, 2, 3, and 4. In particular, the values include f2, f2R, and f2/f2R of Conditional Expression (1), L2, LT, and L2/LT of Conditional Expression (2), and v24, v23, and v23-v24 of Conditional Expression (3).

TABLE 13

|  |  | Zoom lens 1 | Zoom lens 2 | Zoom lens 3 | Zoom lens 4 |
|---|---|---|---|---|---|
|  | f2 | 17.59 | 17.99 | 18.29 | 18.11 |
|  | f2R | −40.61 | −91.03 | −45.23 | −213.56 |
| Conditional Expression (1) | −0.5 < f2/f2R < 0 | −0.43 | −0.20 | −0.40 | −0.08 |
|  | L2 | 8.50 | 8.32 | 8.10 | 8.50 |
|  | LT | 57.80 | 57.27 | 52.60 | 57.10 |
| Conditional Expression (2) | 0.09 < L2/LT < 0.19 | 0.15 | 0.15 | 0.15 | 0.15 |
|  | ν24 | 25.5 | 25.5 | 25.5 | 25.5 |
|  | ν23 | 53.2 | 53.2 | 53.2 | 53.2 |
| Conditional Expression (3) | ν24 − ν23 > 20 | 27.7 | 27.7 | 27.7 | 27.7 |

As shown in Table 13, the zoom lenses 1, 2, 3, and 4 satisfy Conditional Expressions (1) to (3).

Next, an image pickup apparatus according to an embodiment of the present invention is described.

The image pickup apparatus of the embodiment includes a zoom lens, and an image pickup device that converts an optical image formed by the zoom lens into an electric signal.

The zoom lens provided in the image pickup apparatus includes a first lens group having a negative refractive power, a second lens group having a positive refractive power, and a third lens group having a positive refractive power, in that order from an object side to an image side. The first, second, and third lens groups are moved in an optical-axis direction during zooming between a wide-angle end and a telephoto end.

For example, during zooming from the wide-angle end to the telephoto end, the first lens group is moved, the second lens group is moved to the object side, and the third lens group is moved to the image side, in the optical-axis direction such that an air distance between the first and second lens groups is decreased and an air distance between the second and third lens groups is increased.

In the zoom lens provided in the image pickup apparatus of the embodiment of the present invention, the second lens group includes a first lens having a positive refractive power, a second lens having a negative refractive power, a third lens having a negative refractive power, and a fourth lens having a positive refractive power, in that order from the object side to the image side. The third and fourth lenses are bonded, thereby serving as a cemented lens.

In the zoom lens provided in the image pickup apparatus of the embodiment, the second lens group includes the four lenses, and the cemented lens is provided by the third and fourth lenses. That is, the number of lenses is small, and the two lenses serve as the cemented lens. Thus, the optical overall length can be decreased.

The zoom lens provided in the image pickup apparatus of the embodiment is configured to satisfy Conditional Expressions (1) and (2) as follows:

$$-0.5 < f2/f2R < 0, \text{ and} \quad (1)$$

$$0.09 < L2/LT < 0.19, \quad (2)$$

where f2 is a focal length of the second lens group, f2R is a combined focal length of the cemented lens including the third and fourth lenses of the second lens group, L2 is an overall length on an optical axis of the second lens group, and LT is an optical overall length at the telephoto end.

Conditional Expression (1) determines a ratio of the focal length of the second lens group to the focal length of the cemented lens including the third lens having the negative refractive power and the fourth lens having the positive refractive power of the second lens group.

If the value of Conditional Expression (1) is above the upper limit, the position of the principal point of the second lens becomes too close to the image side. The optical overall length may become large. This may be a bottleneck to reduction in size.

In contrast, if the value of Conditional Expression (1) is below the lower limit, the refractive power of the cemented lens including the third lens and the fourth lens of the second lens group becomes excessively large. Hence, a combined refractive power of the first and second lenses of the second lens also becomes large. Accordingly, sensitivities of decentration of the cemented lens, and the first and second lenses of the second lens group become excessively large. Manufacturing may become difficult.

If the value of Conditional Expression (1) is below the lower limit, in particular, a distance between an exit pupil position and an image plane becomes small at the wide-angle end, and an incident angle of an off-axis light beam with respect to the image plane becomes large. Hence, shading is increased.

Conditional Expression (2) determines an overall length of the second lens group.

To decrease the optical overall length of the entire zoom lens system when being collapsed (contracted), it is desirable to decrease the overall length of the second lens group. If the value of Conditional Expression (2) is below the lower limit, however, the overall length of the second lens group becomes excessively small, a sensitivity to a decentration error of the second lens group becomes high. Hence, assembly has to be performed with extremely high accuracy.

In contrast, if the value of Conditional Expression (2) is above the upper limit, the overall length of the second lens group becomes excessively large, and it is difficult to promote reduction in the optical overall length in the collapsed state.

Thus, when the image pickup apparatus of the embodiment satisfies Conditional Expressions (1) and (2), the optical overall length can be decreased, and hence reduction in size can be promoted. Also, productivity can be increased by decreasing the sensitivity of decentration while a high optical performance is provided.

Figure 17:
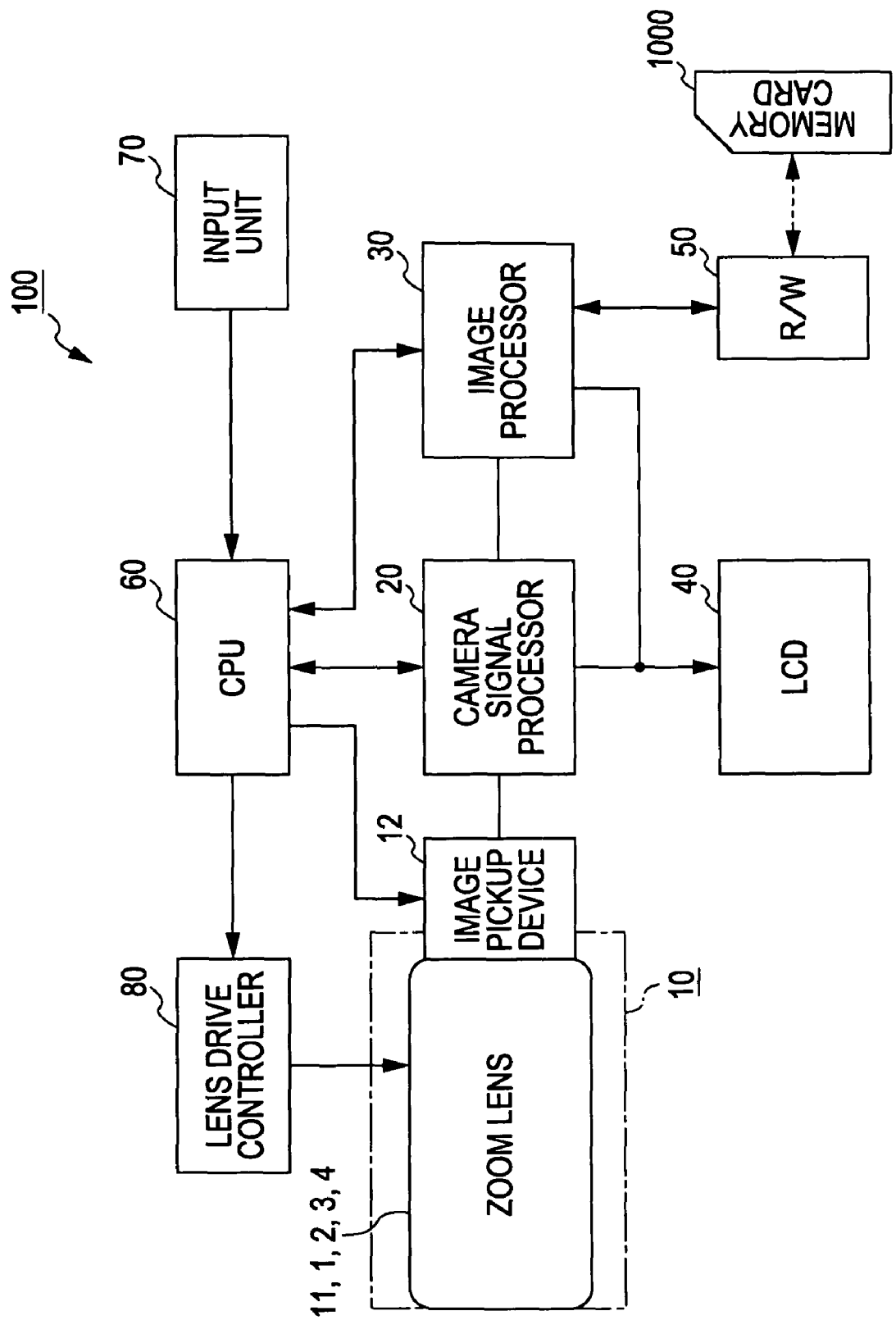
FIG. 17 is a block diagram showing an image pickup apparatus according to an embodiment.

FIG. 17 briefly illustrates a digital still camera as an image pickup apparatus according to an embodiment of the present invention.

An image pickup apparatus (digital still camera) 100 includes a camera block 10 having an image pickup function, a camera signal processor 20 that performs signal processing such as analogue-to-digital conversion of a captured image signal, an image processor 30 that performs recording and reproducing processing of the image signal, a liquid crystal display (LCD) 40 that displays the captured image and the like, a reader/writer (R/W) 50 that performs reading and writing of the image signal to a memory card 1000, a central processing unit (CPU) 60 that controls the entire image pickup apparatus, an input unit 70 with which a user performs a predetermined operation, and a lens drive controller 80 that controls driving of a lens arranged in the camera block 10.

The camera block 10 includes a zoom lens 11 (the zoom lens 1, 2, 3, or 4 to which the present invention is applied), and an image pickup device 12, such as a charge coupled device (CCD) or a complementary metal oxide semiconductor (CMOS).

The camera signal processor 20 performs, for example, conversion of an output signal from the image pickup device 12 into a digital signal, noise rejection, image quality correction, conversion to a luminance signal and a color-difference signal.

The image processor 30 performs compression/encoding and decompression/decoding of the image signal based on a predetermined image data format, and conversion of a data specification such as resolution.

The LCD 40 has a function of displaying an operation state of the user to the input unit 70, and various data such as the captured image.

The R/W 50 performs writing of the image data encoded by the image processor 30 to the memory card 1000, and reading of the image data stored in the memory card 1000.

The CPU 60 functions as a control processor that controls circuit blocks provided in the image pickup apparatus 100. The CPU 60 controls the circuit blocks on the basis of, for example, an instruction input signal from the input unit 70.

The input unit 70 is, for example, a shutter release button for a shutter operation, and a selection switch for selection of an operation mode. The input unit 70 outputs an instruction input signal in accordance with the operation of the user to the CPU 60.

The lens drive controller 80 controls a motor and the like (not shown) that drives the lenses of the zoom lens 11 on the basis of a control signal from the CPU 60.

The memory card 1000 is, for example, a semiconductor memory detachably attached to a slot connected to the R/W 50.

The operation of the image pickup apparatus 100 is described below.

In a standby state of shooting, under the control of the CPU 60, the image signal captured at the camera block 10 is output to the LCD 40 via the camera signal processor 20. The image signal is displayed on the LCD 40 as a camera through image. When an instruction input signal for zooming is input from the input unit 70, the CPU 60 outputs a control signal to the lens drive controller 80. Under the control of the lens drive controller 80, a predetermined lens of the zoom lens 11 is moved.

When a shutter (not shown) of the camera block 10 is operated by an instruction input signal from the input unit 70, the captured image signal is output from the camera signal processor 20 to the image processor 30, is compressed and encoded, and is converted into digital data of a predetermined data format. The converted data is output to the R/W 50, and is written in the memory card 1000.

Focusing is performed, for example, when the shutter release button of the input unit 70 is half pressed or fully pressed for recording (shooting). During focusing, the lens drive controller 80 moves a predetermined lens of the zoom lens 11 on the basis of the control signal from the CPU 60.

To reproduce the image data stored in the memory card 1000, predetermined image data is read from the memory card 1000 by the R/W 50 in accordance with the operation to the input unit 70. The image processor 30 performs decompression/decoding, and the reproduced image signal is output to the LCD 40 for displaying the reproduced image.

While the image pickup apparatus is applied to the digital still camera in the above-described embodiment, the application of the image pickup apparatus is not limited to the digital still camera, and may be applied to a digital video camera, or a camera section of a digital input/output apparatus such as a mobile phone with a camera, or a personal digital assistant (PDA) with a camera.

The shapes and numerical values of the respective parts described in the embodiments are merely examples of implementation of the present invention.

The present application contains subject matter related to that disclosed in Japanese Priority Patent Application JP 2008-137106 filed in the Japan Patent Office on May 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
a first lens group having a negative refractive power, a second lens group having a positive refractive power, and a third lens group having a positive refractive power, in that order from an object side to an image side,
wherein, during zooming from a wide-angle end to a telephoto end, the first lens group is moved, and the second lens group is moved to the object side, in an optical-axis direction such that an air distance between the first and second lens groups is decreased and an air distance between the second and third lens groups is increased,
wherein the second lens group includes a first lens having a positive refractive power, a second lens having a negative refractive power, a third lens having a negative refractive power, and a fourth lens having a positive refractive power, in that order from the object side to the image side,
wherein the third and fourth lenses of the second lens group are bonded to each other to serve as a cemented lens, and
wherein the zoom lens is configured to satisfy Conditional Expressions (1) and (2) as follows, $$-0.5 < f2/f2R < 0, \text{ and} \tag{1}$$

$$0.09 < L2/LT < 0.19, \tag{2}$$

where f2 is a focal length of the second lens group, f2R is a combined focal length of the cemented lens including the third and fourth lenses of the second lens group, L2 is an overall length on an optical axis of the second lens group, and LT is an optical overall length at the telephoto end.

2. The zoom lens according to claim 1, wherein the zoom lens is configured to satisfy Conditional Expression (3) as follows:

$$v24 - v23 > 20, \tag{3}$$

where v24 is an Abbe number of the fourth lens of the second lens group, v23 is an Abbe number of the third lens of the second lens group.

3. The zoom lens according to claim 1 or 2, wherein an image-side surface of the fourth lens of the second lens group is aspherical.

4. An image pickup apparatus comprising:
a zoom lens; and
an image pickup device that converts an optical image formed by the zoom lens into an electric signal,
wherein the zoom lens includes,
a first lens group having a negative refractive power, a second lens group having a positive refractive power, and a third lens group having a positive refractive power, in that order from an object side to an image side,
wherein, during zooming from a wide-angle end to a telephoto end, the first lens group is moved, and the second lens group is moved to the object side, in an optical-axis direction such that an air distance between the first and second lens groups is decreased and an air distance between the second and third lens groups is increased, wherein the second lens group includes a first lens having a positive refractive power, a second lens having a negative refractive power, a third lens having a negative refractive power, and a fourth lens having a positive refractive power, in that order from the object side to the image side, wherein the third and fourth lenses of the second lens group are bonded to each other to serve as a cemented lens, and wherein the zoom lens is configured to satisfy Conditional Expressions (1) and (2) as follows, $$-0.5 < f2/f2R < 0, \text{ and} \tag{1}$$

$$0.09 < L2/LT < 0.19, \tag{2}$$

where f2 is a focal length of the second lens group, f2R is a combined focal length of the cemented lens including the third and fourth lenses of the second lens group, L2 is an overall length on an optical axis of the second lens group, and LT is an optical overall length at the telephoto end.

* * * * *